US012791845B2

(12) United States Patent
Kim et al.

(10) Patent No.: US 12,791,845 B2
(45) Date of Patent: Nov. 10, 2026

(54) MICROSCOPE ENABLING DIFFERENTIAL PHASE CONTRAST IMAGING OF OBLIQUE FOCAL PLANE AND METHOD FOR OPERATING SAME

(71) Applicants: POSTECH RESEARCH AND BUSINESS DEVELOPMENT FOUNDATION, Pohang-si (KR); UIF (University Industry Foundation), Yonsei University, Seoul (KR)

(72) Inventors: Ki Hean Kim, Pohang-si (KR); Jung Bin Lee, Pohang-si (KR); Su Il Jeon, Pohang-si (KR); No Seong Park, Pohang-si (KR); Ji Eun Yun, Pohang-si (KR); Seong Han Kim, Pohang-si (KR); Chulmin Joo, Seoul (KR)

(73) Assignees: POSTECH RESEARCH AND BUSINESS DEVELOPMENT FOUNDATION, Pohang-si (KR); UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 19/071,637

(22) Filed: Mar. 5, 2025

(65) Prior Publication Data

US 2025/0284106 A1 Sep. 11, 2025

(30) Foreign Application Priority Data

Mar. 6, 2024 (KR) ........................ 10-2024-0031805
Feb. 28, 2025 (KR) ........................ 10-2025-0026497

(51) Int. Cl.
*G02B 21/00* (2006.01)
*H04N 23/16* (2023.01)
(Continued)

(52) U.S. Cl.
CPC ....... *G02B 21/008* (2013.01); *G02B 21/0056* (2013.01); *H04N 23/16* (2023.01);
(Continued)

(58) Field of Classification Search
CPC .. G02B 21/008; G02B 21/0056; G02B 21/14; G02B 21/18; G02B 21/361;
(Continued)

(56) References Cited

U.S. PATENT DOCUMENTS

2018/0143415 A1* 5/2018 Hollricher .............. G02B 21/36
2019/0324241 A1* 10/2019 Xu ....................... G02B 21/008
(Continued)

FOREIGN PATENT DOCUMENTS

JP 2020-524819 A 8/2020
KR 10-1986658 B1 6/2019
(Continued)

OTHER PUBLICATIONS

Office Action in Korean Application No. 10-2025-0026497, dated Jun. 4, 2026, 24 pages including translation.

*Primary Examiner* — Richard T Torrente
(74) *Attorney, Agent, or Firm* — Morgan, Lewis & Bockius LLP

(57) ABSTRACT

Proposed is a microscope enabling differential phase contrast imaging of oblique focal plane and a method for operating the same, which can image a large area 3D surface by scanning and photographing in a horizontal direction a focal plane tilted by applying an oblique plane microscopy (OPM) technology that tilts a focal plane of a photographing area of a microscope. The microscope includes a sample photographing module for photographing a sample and an imaging generator for generating a sample imaging on the basis of an image of the sample photographed in the sample photographing module, wherein the sample photographing
(Continued)

module includes a light source unit for radiating light to the sample, an objective lens for obtaining transmitted light from the sample, and an imaging information acquisition unit for obtaining imaging information of the sample through the transmitted light.

11 Claims, 19 Drawing Sheets

(51) Int. Cl.
*H04N 23/55* (2023.01)
*H04N 23/56* (2023.01)
*H04N 23/90* (2023.01)

(52) U.S. Cl.
CPC ............. *H04N 23/55* (2023.01); *H04N 23/56* (2023.01); *H04N 23/90* (2023.01)

(58) Field of Classification Search
CPC ...... G02B 21/367; H04N 23/16; H04N 23/55; H04N 23/56; H04N 23/90
See application file for complete search history.

(56) References Cited

U.S. PATENT DOCUMENTS

2020/0237272 A1* 7/2020 Lin ...................... A61B 5/0068
2021/0381968 A1* 12/2021 Hong ................. G02B 21/0056
2023/0408803 A1* 12/2023 Hillman ............. G02B 21/0076
2025/0012723 A1* 1/2025 Hillman ............. G02B 21/0076
2025/0216659 A1* 7/2025 Kim ....................... A61B 10/02

FOREIGN PATENT DOCUMENTS

KR 10-2021-0051683 A 5/2021
KR 10-2022-0072691 A 6/2022

* cited by examiner

MICROSCOPE ENABLING DIFFERENTIAL PHASE CONTRAST IMAGING OF OBLIQUE FOCAL PLANE AND METHOD FOR OPERATING SAME

CROSS REFERENCE TO RELATED APPLICATIONS

The present application claims priority to Korean Patent Application No. 10-2024-0031805, filed on Mar. 6, 2024, and Korean Patent Application No. 10-2025-0026497, filed on Feb. 28, 2025, the entire contents of which are incorporated herein for all purposes by this reference.

National Research and Development Project Supporting the Present Disclosure

Project Serial Number: 1711180112
Project Number: 2020R1A2C3009309
Ministry Name: Ministry of Science, Technology and Innovation
Project Management (Specialized)
Institution: National Research Foundation of Korea (NRF)
Research Business: Individual basic research (Ministry of Science, Technology and Innovation)
Research Topic: Development of high speed, high-definition microscope available for use in clinical trials and real-time image analysis method
Contribution Ratio: 1/1
Project Performing Institution: Pohang University of Science & Technology
Research Period: From Mar. 1, 2023 to Feb. 29, 2024
Project Serial Number: 2710001577
Project Number: 00219421
Ministry Name: Ministry of Science, Technology and Innovation
Project Management (Specialized)
Institution: National Research Foundation of Korea (NRF)
Research Business: Group research support
Research Topic: Ocular Surface Neuro-Immune Laboratory Based on Corneal Nerve Visualization Technology
Contribution Ratio: 1/1
Project Performing Institution: Pohang University of Science & Technology
Research Period: From Mar. 1, 2024 to Feb. 28, 2025

BACKGROUND

Technical Field

The present disclosure relates to a microscope enabling differential phase contrast imaging of oblique focal plane and a method for operating the same and, more specifically, to the microscope enabling differential phase contrast imaging of oblique focal plane and the method for operating the same, which is capable of imaging a large area 3D surface by scanning and photographing in a horizontal direction a focal plane tilted by applying an oblique plane microscopy (OPM) technology that tilts a focal plane of a photographing area of a microscope.

Description of the Related Art

Fluorescence microscopy is widely used in the fields of biological research and medical diagnostics to investigate structures and functions of cells and tissues.

However, such fluorescence microscopy requires a special staining process for cells before observing a sample, and various problems arise because of the staining.

The process of staining cells processes a sample by using fluorescent dyes and requires a waiting time for staining, which reduces time efficiency of experiments and makes it difficult to observe cells immediately.

In addition, the staining process itself may affect biological tissues. That is, in the process of staining cells, there is a concern that the dye may change the chemical or physiological properties of the cells or tissues, owing to which actual states inside the living body may be distorted and the reliability of the measurement results can be reduced.

To overcome the problems described above, differential phase contrast (DPC) imaging technology has been proposed and the differential phase contrast imaging technology enables to overcome the limitations of fluorescence microscopy and to make it possible to observe biological tissues more accurately, as a technology that can visualize shapes of cells with high contrast without a staining process.

That is, the differential phase contrast imaging technology detects optical differences and visualizes phase changes of biological tissues, such that it is possible to observe shapes of a sample without any distortion caused by staining.

However, the current differential phase contrast imaging technology has a problem of spending a lot of time on photographing multiple images in a horizontal direction for 3D volume imaging.

RELATED ART DOCUMENTS

Patent Document (Patent Document 1) Korean Patent No. 10-1986658 (Invention Title: Method of Acquiring an Image of a Biological Sample, Published on May 31, 2019)

SUMMARY

Accordingly, an objective of the present disclosure is to provide a microscope enabling differential phase contrast imaging of oblique focal plane and a method for operating the same, which is capable of imaging a large area of 3D surface by scanning and photographing in a horizontal direction a focal plane tilted by applying an oblique plane microscopy (OPM) technology that tilts a focal plane of a photographing area of a microscope.

The tasks of the present disclosure are not limited to the tasks mentioned above, and other tasks not mentioned will be clearly understood by those skilled in the art from the following description.

In order to solve the problem described above, the present disclosure provides a microscope enabling differential phase contrast imaging of oblique focal plane, which includes a sample photographing module for photographing a sample and an imaging generator for generating a sample imaging on the basis of an image of the sample photographed in the sample photographing module, wherein the sample photographing module includes a light source unit for radiating light to the sample, an objective lens for obtaining transmitted light from the sample, and an imaging information acquisition unit for obtaining imaging information of the sample through the transmitted light and wherein a focal plane of the sample photographed by the sample photographing module is tilted at a predetermined angle.

Herein, the light source unit may include a first light source unit for radiating a first wavelength light to the sample in a first direction, and a second light source unit for radiating a second wavelength light to the sample in a second direction, and the imaging information acquisition unit may include a first camera for obtaining a first imaging information of the sample through a first transmitted light, the transmitted light of the first wavelength light, from the sample and a second camera for obtaining a second imaging information of the sample through a second transmitted light, the transmitted light of the second wavelength light, from the sample.

In addition, the sample photographing module may further include a first dichroic beam splitter disposed among the objective lens, the first camera, and the second camera, for guiding the first transmitted light to the first camera and guiding the second transmitted light to the second camera, and a tilt correction unit disposed between the objective lens and the first dichroic beam splitter for correcting tilts of focal planes of the first transmitted light and the second transmitted light.

In addition, the tilt correction unit may include a correction mirror formed with a tilt of a predetermined angle for correcting the tilts of the focal planes of the first transmitted light and the second transmitted light obtained from the objective lens, a first signal transmission objective lens for obtaining the first transmitted light and the second transmitted light whose focal planes are corrected by the correction mirror, and a pre-beam splitter for guiding the first transmitted light and the second transmitted light obtained from the objective lens to the correction mirror and guiding the first transmitted light and the second transmitted light obtained from the first signal transmission objective lens to the first dichroic beam splitter.

In addition, the tilt correction unit may include a second signal transmission objective lens for transmitting the first transmitted light and the second transmitted light obtained from the objective lens, and a third signal transmission objective lens disposed to be tilted at a predetermined angle from the second signal transmission objective lens for obtaining the first transmitted light and the second transmitted light from the second signal transmission objective lens and correcting the tilts of the focal planes of the first transmitted light and the second transmitted light.

In addition, the sample photographing module may further include a beam splitter disposed between the objective lens and the imaging information acquisition unit, and a pupil information acquisition unit for obtaining pupil information of the sample through the transmitted light, wherein the pupil information acquisition unit includes a third camera for obtaining a first pupil information of the sample through the first transmitted light, a fourth camera for obtaining a second pupil information of the sample through the second transmitted light, and a second dichroic beam splitter disposed between the third camera and the fourth camera for guiding the first transmitted light to the third camera and guiding the second transmitted light to the fourth camera, and wherein the beam splitter guides the first imaging information in the first transmitted light and the second imaging information in the second transmitted light toward the first camera and the second camera and guides the first pupil information in the first transmitted light and the second pupil information in the second transmitted light to the third camera and the fourth camera.

In addition, the imaging generator may include a differential phase contrast (DPC) imaging generator for generating a differential phase contrast (DPC) image based on the first imaging information and the second imaging information, a transfer function generator for calculating an optical transfer function (OTF) on the basis of the first pupil information and the second pupil information, and an intermediate image generator for generating a phase delay information image as the differential phase contrast image is deconvolved by using the optical transfer function.

In addition, further included may be a transfer module coupled to the sample photographing module for moving the sample photographing module in a horizontal direction.

In addition, the sample photographing module may further include a scanning unit disposed between the objective lens and the tilt correction unit for moving a photographing area of the sample as an angle is adjusted.

In addition, further included may be a final image generator for generating a final image by extracting and synthesizing only an in-focusing area among the phase delay information images when there are a plurality of phase delay information images.

In addition, the present disclosure provides a method for operating a microscope enabling differential phase contrast imaging of oblique focal plane, which includes a sample photographing step for photographing a sample by a sample photographing module and an imaging generation step for generating a sample imaging by an imaging generator on the basis of an image of the sample photographed in the sample photographing module, wherein the sample photographing step includes a light radiation step for radiating light to the sample by a light source unit, a transmitted light acquisition step for obtaining transmitted light from the sample by an objective lens, and an imaging information acquisition step for obtaining imaging information of the sample through the transmitted light by an imaging information acquisition unit, and wherein a focal plane of the sample photographed in the sample photographing step is tilted at a predetermined angle.

Herein, the light radiation step may include a first light radiation step for radiating a first wavelength light to the sample in a first direction by a first light source unit and a second light radiation step for radiating a second wavelength light to the sample in a second direction by a second light source unit, and the imaging information acquisition step may include a first imaging information acquisition step for obtaining a first imaging information of the sample through a first transmitted light, the transmitted light of the first wavelength light, by a first camera, and a second imaging information acquisition step for obtaining a second imaging information of the sample through a second transmitted light, the transmitted light of the second wavelength light, by a second camera.

In addition, the sample photographing step may include a tilt correction step for correcting tilts of focal planes of the first transmitted light and the second transmitted light by a tilt correction unit disposed among the objective lens, the first camera, and the second camera, after the transmitted light acquisition step, and an imaging information guide step for guiding the first transmitted light to the first camera and guiding the second transmitted light to the second camera by a first dichroic beam splitter disposed among the tilt correction unit, the first camera, and the second camera.

In addition, the tilt correction step may include a first guide step for guiding the first transmitted light and the second transmitted light obtained in the objective lens to a correction mirror formed with a tilt of a predetermined angle by a pre-beam splitter, a mirror correction step for correcting the tilts of the focal planes of the first transmitted light and the second transmitted light obtained in the objective lens by the correction mirror, a first signal transmission step for obtaining the first transmitted light and the second transmitted light, whose focal planes are corrected by the correction mirror, from a first signal transmission objective lens, and a second guide step for guiding the first transmitted light and the second transmitted light obtained from the first signal transmission objective lens to the first dichroic beam splitter by the pre-beam splitter.

In addition, the tilt correction step may include a first transmission step for moving the first transmitted light and the second transmitted light obtained from the objective lens to a second signal transmission objective lens, and a second transmission step for obtaining the first transmitted light and the second transmitted light from the second signal transmission objective lens by a third signal transmission objective lens, wherein the third signal transmission objective lens in the second transmission step is disposed to be tilted at a predetermined angle from the second signal transmission objective lens, for correcting the tilts of the focal planes of the first transmitted light and the second transmitted light.

In addition, after the tilt correction step, the sample photographing step may include an information separation step for guiding the first imaging information in the first transmitted light and a second imaging information in the second transmitted light toward the first camera and the second camera and guiding the first pupil information in the first transmitted light and the second pupil information in the second transmitted light toward a third camera and a fourth camera by a beam splitter, a pupil information guide step for guiding the first transmitted light to the third camera and guiding the second transmitted light to the fourth camera by a second dichroic beam splitter disposed between the third camera and the fourth camera, a first pupil information acquisition step for obtaining the first pupil information of the sample through the first transmitted light by the third camera, and a second pupil information acquisition step for obtaining the second pupil information of the sample through the second transmitted light by the fourth camera.

In addition, the imaging generation step may include a differential phase contrast image generation step for generating a differential phase contrast image based on the first imaging information and the second imaging information by a differential phase contrast image generator, a transfer function generation step for calculating an optical transfer function on the basis of the first pupil information and the second pupil information by a transfer function generator, and an intermediate image generation step for generating a phase delay information image as the differential phase contrast image is deconvolved by using the optical transfer function by an intermediate image generator.

In addition, further included may be a transfer step for moving the sample photographing module in a horizontal direction by a transfer module coupled to the sample photographing module, after the imaging generation step.

In addition, the sample photographing step may further include a scanning unit rotation step for moving a photographing area of the sample after the imaging information guide step as a scanning unit disposed between the objective lens and the tilt correction unit adjusts an angle.

In addition, further included may be a final image generation step for generating a final image by extracting and synthesizing only an in-focusing area among the phase delay information images by a final image generator when there are a plurality of phase delay information images.

In addition, the light source unit may be composed of one light source, and the imaging generator may include a one-side light source image generator for generating a one-side light source image generated by the one light source, an opposite light source image generator for generating an opposite light source image from the one-side light source image, a phase recovery unit for recovering a phase from the one-side light source image and the opposite light source image, and a final image generator for generating a final image from the one-side light source image, the opposite light source image, and the recovered phase.

The microscope enabling differential phase contrast imaging of oblique focal plane and the method for operating the same may have the following effects according to the present disclosure.

First, it may have the advantage of imaging a large area 3D surface by scanning and photographing in a horizontal direction a focal plane tilted by applying an oblique plane microscopy (OPM) technology that tilts a focal plane of a photographing area of a microscope.

Second, as a structure of an object can be visualized without a staining process in visualizing biological tissue, it may have the advantages of more accurately identifying a sample by preventing chemical or physiological properties of cells or tissues from being altered by staining and of increasing time efficiency by omitting the staining process.

Third, it may have the advantage of obtaining a flat image of a cell by including a tilt correction unit for correcting a tilt of a focal plane of transmitted light obtained from an objective lens.

Fourth, it may have the advantages that a differential phase contrast (DPC) image with high contrast is obtained and, through this, quantitative physical states of a cell can be additionally identified, as pupil information is obtained from light transmitted through sample and a phase delay information image is generated using this.

Fifth, it may have the advantage of imaging a large-area sample as a photographing area of the sample can be moved using a transfer module or a scanning unit to photograph the sample.

Sixth, it may have the advantage of shortening a preparation time for photographing as people and animals can be photographed directly under a microscope without collecting human or animal samples.

Seventh, in the case of the present disclosure, it may have the advantage of being able to obtain imaging of a wider variety of cells in a more universal manner compared to a conventional method of obtaining imaging by using fluorescent staining, which visualizes only some cells that could be stained with fluorescent staining, such as conjunctival goblet cells.

Eighth, it may be possible to simplify devices and reduce image resources, such that high-speed imaging can be efficiently realized, as deriving an image by an opposite light source from an image obtained by a one-side light source by using artificial intelligence when only a one-side light source is used.

The effects of the present disclosure are not limited to the effects mentioned above, and other effects not mentioned will be clearly understood by those skilled in the art from the description of the claims.

DETAILED DESCRIPTION OF THE DISCLOSURE

Figure 1:
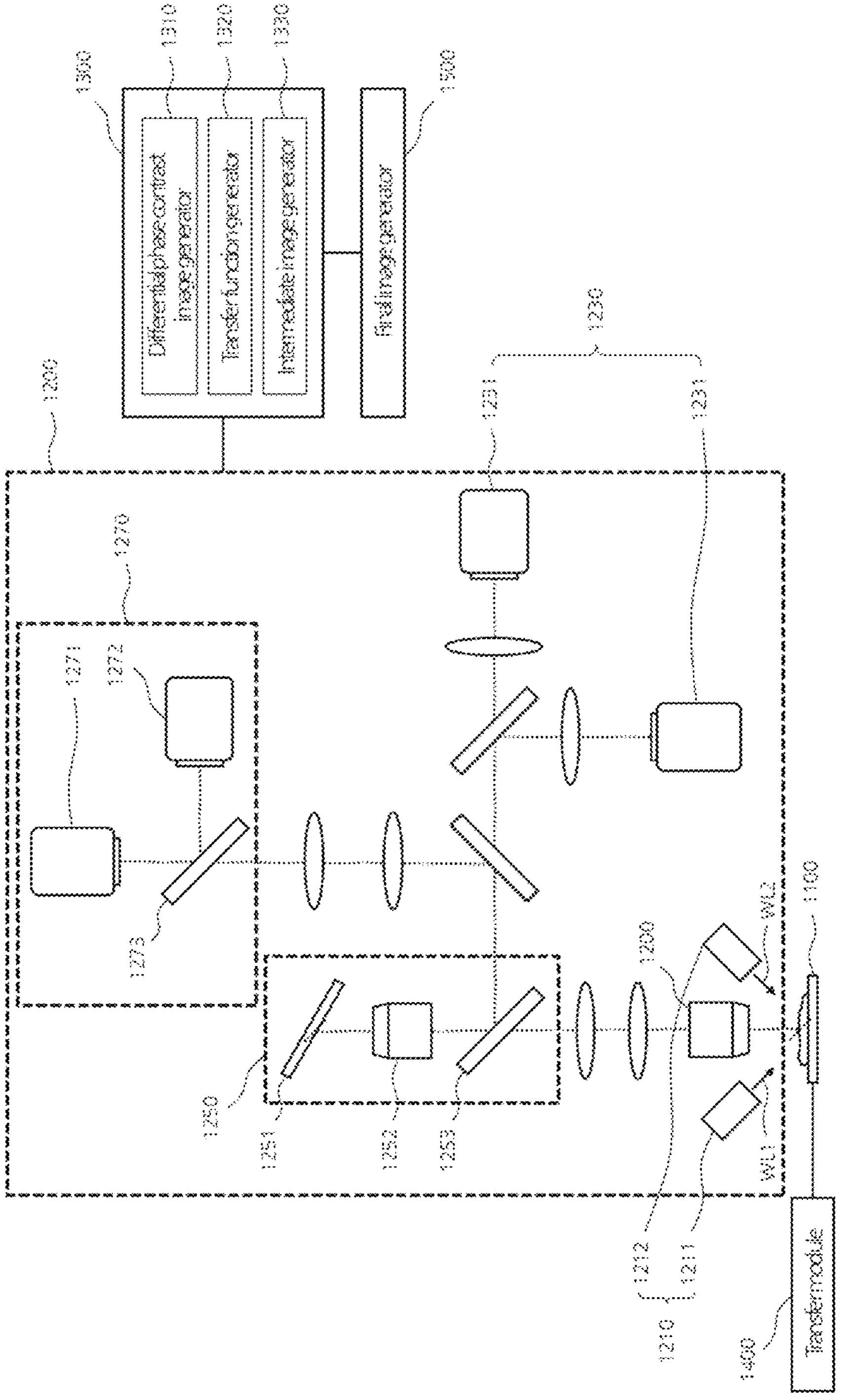
FIG. 1 is a view showing a first exemplary embodiment of a microscope enabling differential phase contrast imaging of oblique focal plane according to the present disclosure.

The advantages and features of the present disclosure and methods for achieving them will become clear with reference to exemplary embodiments described below in detail below together with the accompanying drawings. However, the present disclosure is not limited to the exemplary embodiments disclosed below, but may be implemented in various forms different from each other, and the present embodiments may be provided only to make the disclosure of the present disclosure complete and to fully inform those skilled in the art of the scope of the present disclosure, and the present disclosure may be defined only by the scope of the claims. Throughout the present specification, the same reference numerals may refer to the same components.

The sizes, shapes, and the like of components shown in the drawings accompanying the present specification may be exaggerated for clarity and convenience of explanation. It should be noted that the same configurations in each drawing are illustrated with the same reference numerals. In addition, detailed descriptions of the functions and configurations of known technologies determined to unnecessarily obscure the gist of the present disclosure may be omitted.

Terms used in the present specification may be used to describe specific exemplary embodiments and may not be intended to limit the present disclosure. As used in the present specification, the singular form may include the plural form unless clearly indicating another case in the context. In addition, when a part throughout the present specification is said to "include" a certain component, it may mean that other components may be further included unless specifically stated otherwise.

When it is mentioned that a component is connected or linked to another component, it should be understood that it may be directly connected or linked to that other component, but that there may be other components in between. Meanwhile, when it is mentioned that one component is directly connected or directly linked to another component, it should be understood that there are no other components in between. Other expressions used to describe relationships between components should be interpreted in a similar way.

The terms used in the specification such as top, bottom, upper surface, lower surface, upper part, and lower part may be used to distinguish the relative positions of components. For example, when an upper direction in the drawing is conveniently referred to as an upper part and a lower direction in the drawing is referred to as a lower part, in practice, the upper part may be referred to as the lower part and the lower part may be referred to as the upper part without departing from the scope of the present disclosure.

Terms including ordinal numbers described in the present specification, such as first, and second may be used to describe various components, but the components are not limited by the terms. The terms may be only used to distinguish each component from other components, and may not be limited by the manufacturing order, and the names may not be consistent in the detailed description of the present disclosure and the claims.

All terms, including technical or scientific terms, used in the present specification may have the same meaning as commonly understood by those skilled in the art to which the present disclosure belongs, unless otherwise defined. Such terms, as defined in commonly used dictionaries, should be construed to have a meaning consistent with the meaning of the context of the relevant technology and should not be interpreted in an ideal or overly formal sense unless explicitly defined in the present specification.

Hereinafter, the present disclosure will be described with reference to drawings in order to describe a microscope enabling differential phase contrast imaging of oblique focal plane and a method for operating the same according to an exemplary embodiment of the present disclosure.

Figure 2:
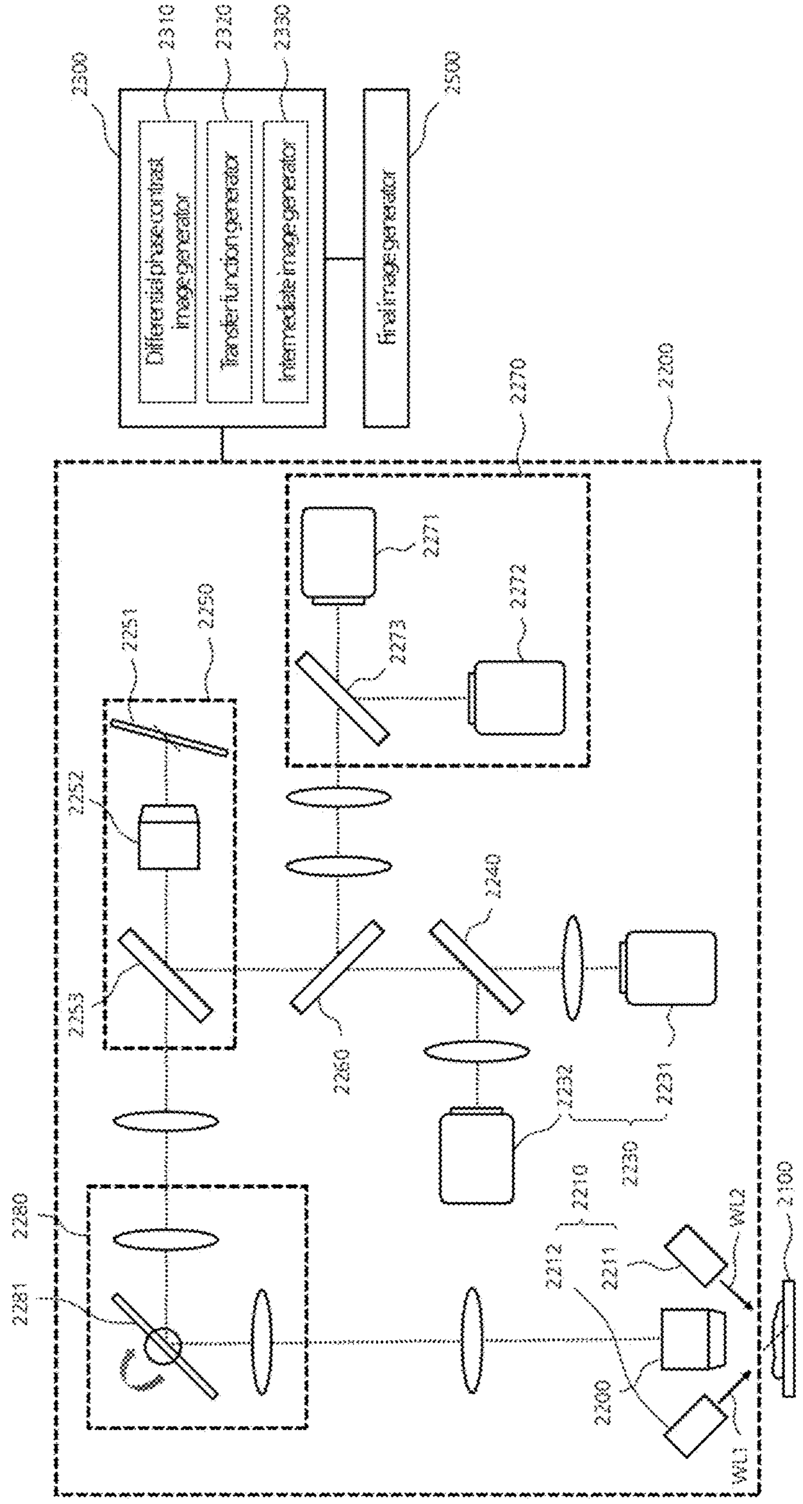
FIG. 2 is a view showing a second exemplary embodiment of a microscope enabling differential phase contrast imaging of oblique focal plane according to the present disclosure.
Figure 3:
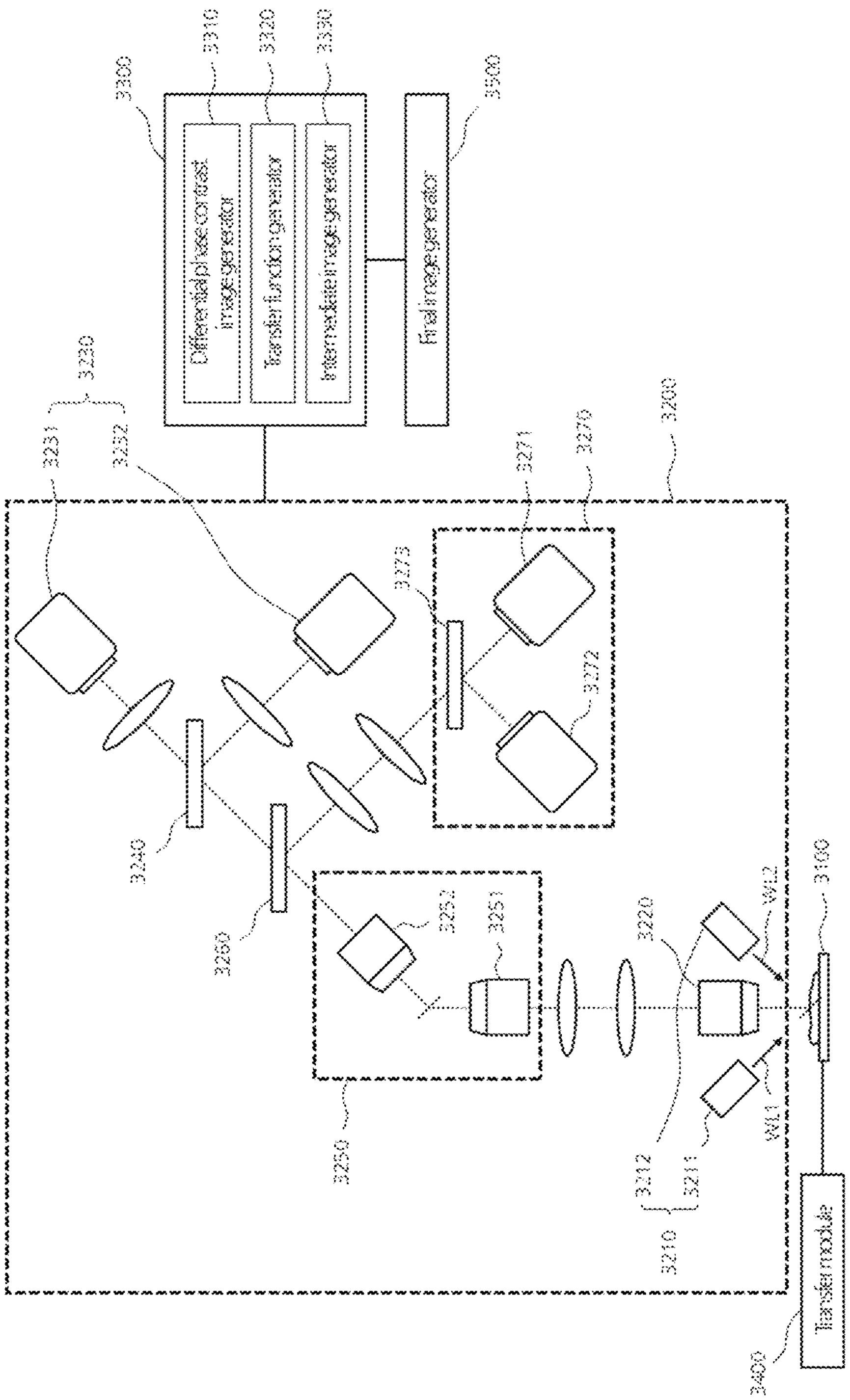
FIG. 3 is a view showing a third exemplary embodiment of a microscope enabling differential phase contrast imaging of oblique focal plane according to the present disclosure.
Figure 4:
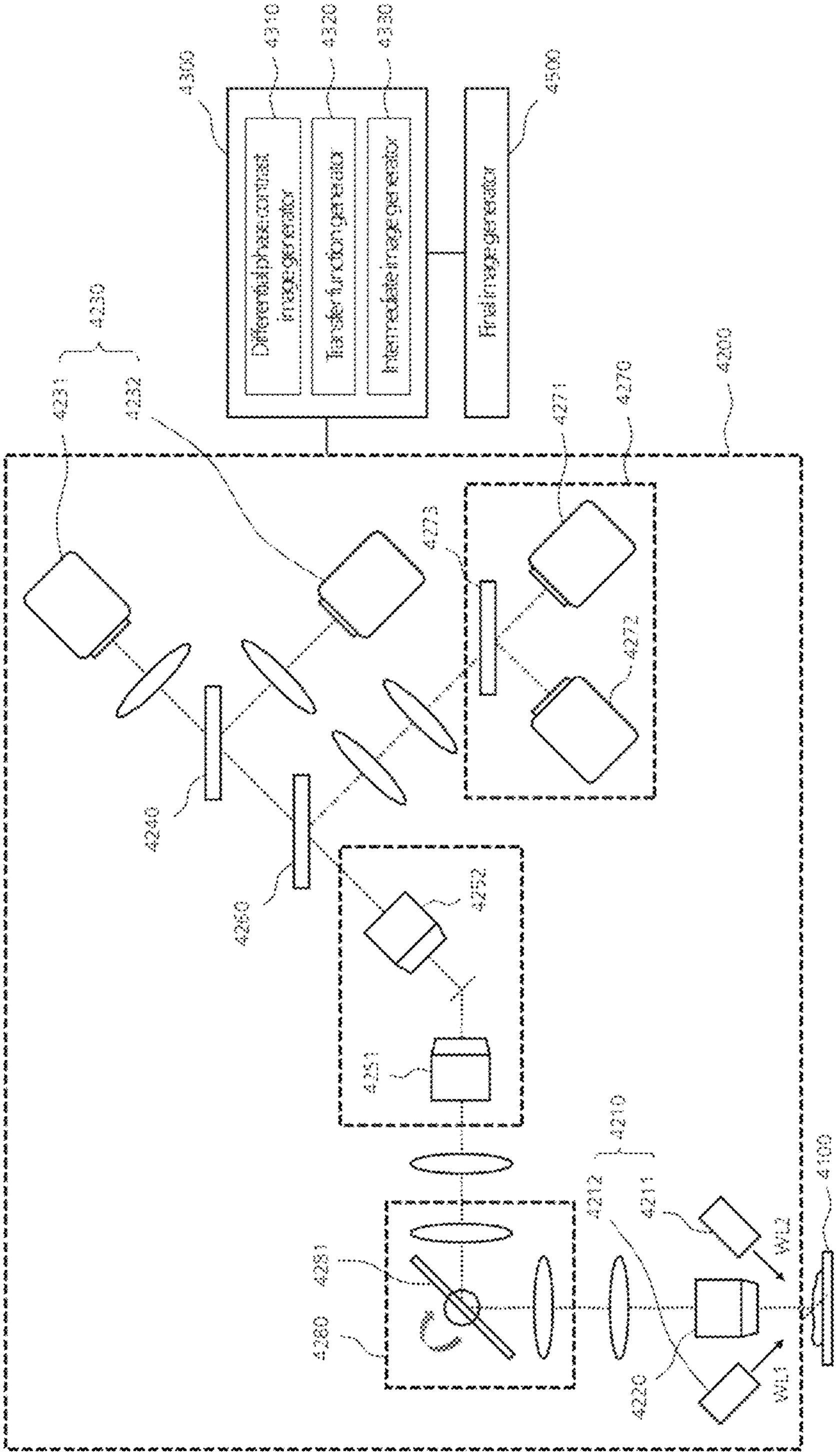
FIG. 4 is a view showing a fourth exemplary embodiment of a microscope enabling differential phase contrast imaging of oblique focal plane according to the present disclosure.
Figure 5A:
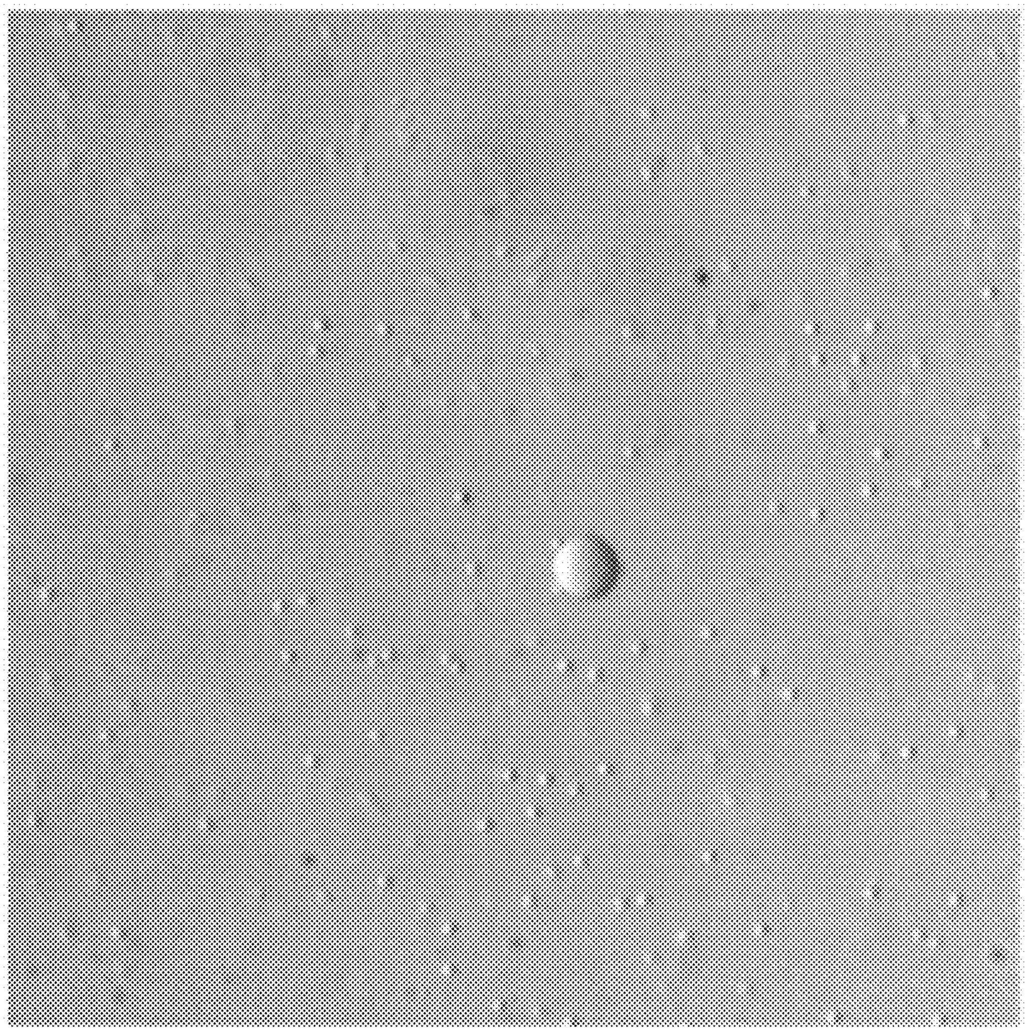
FIGS. 5A and 5B are views showing an example of a first imaging information obtained by a first camera and a second imaging information obtained by a second camera in a microscope enabling differential phase contrast imaging of oblique focal plane according to the present disclosure.
Figure 5B:
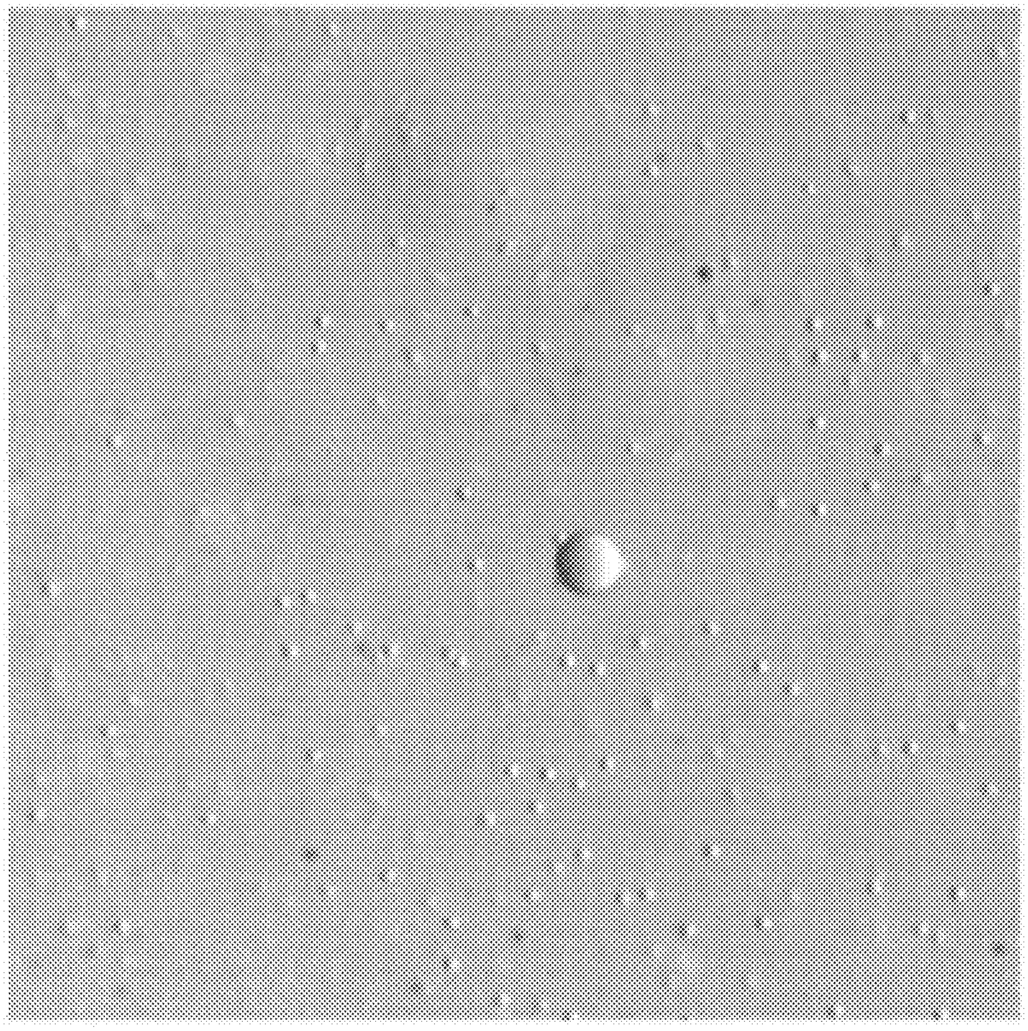
Figure 6:
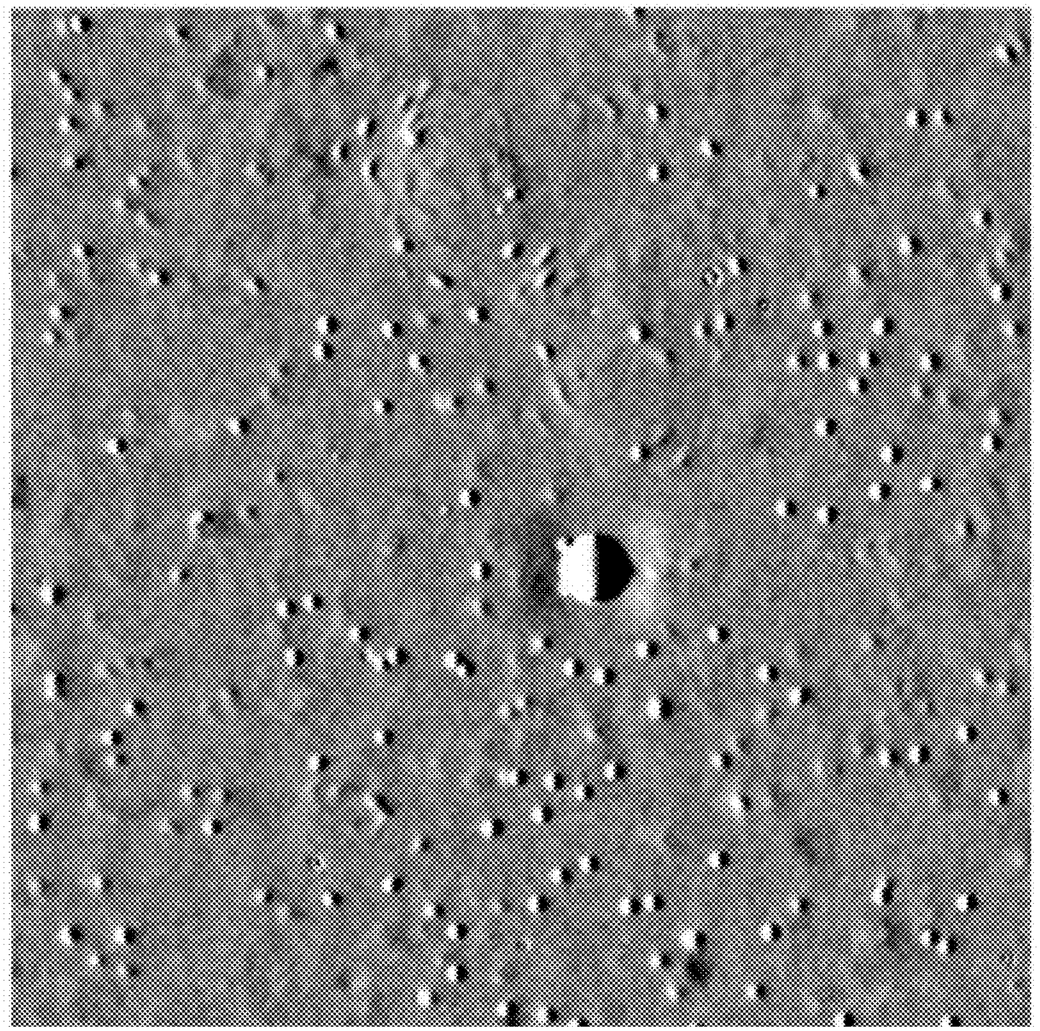
FIG. 6 is a view showing an example of a differential phase contrast image generated by a differential phase contrast image generator on the basis of a first imaging information and a second imaging information in a microscope enabling differential phase contrast imaging of oblique focal plane according to the present disclosure.
Figure 7A:
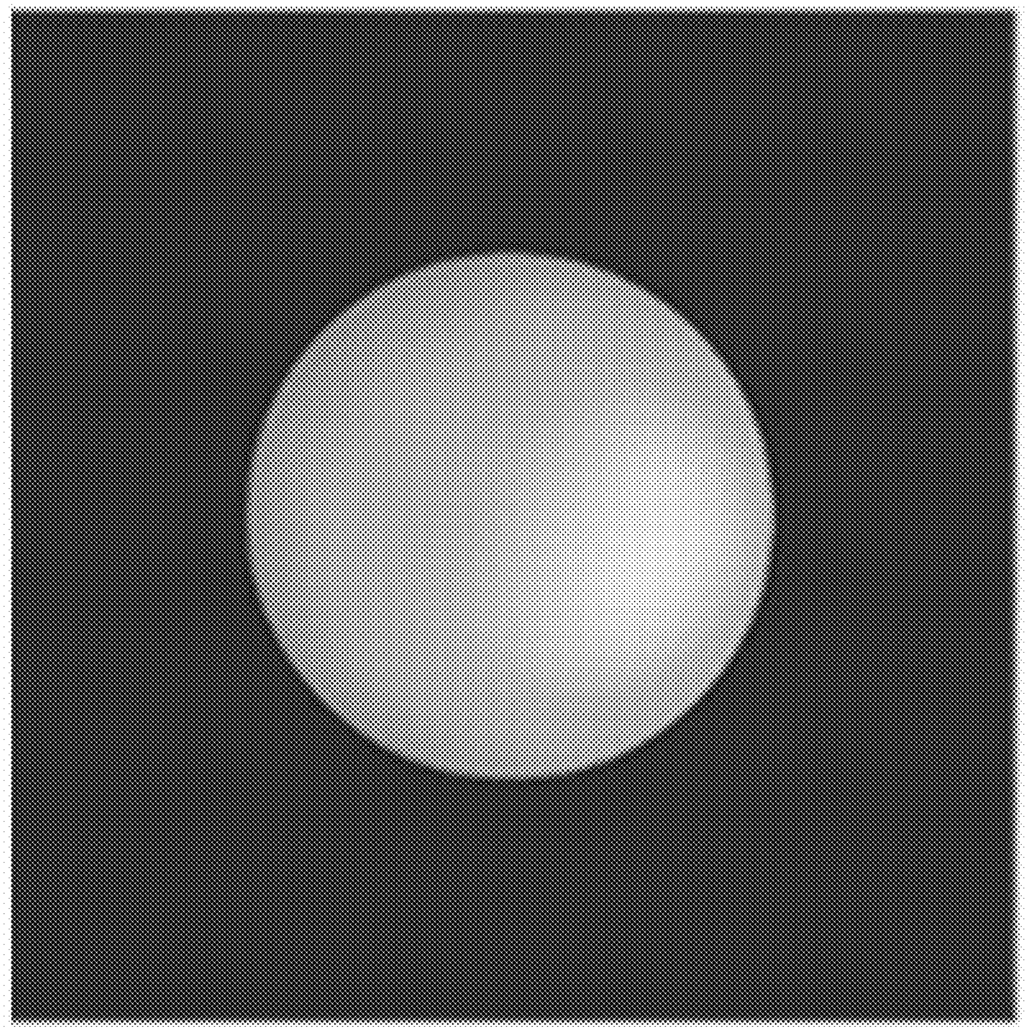
FIGS. 7A and 7B are views showing an example of a third imaging information obtained by a third camera and a fourth imaging information obtained by a fourth camera in a microscope enabling differential phase contrast imaging of oblique focal plane according to the present disclosure.
Figure 7B:
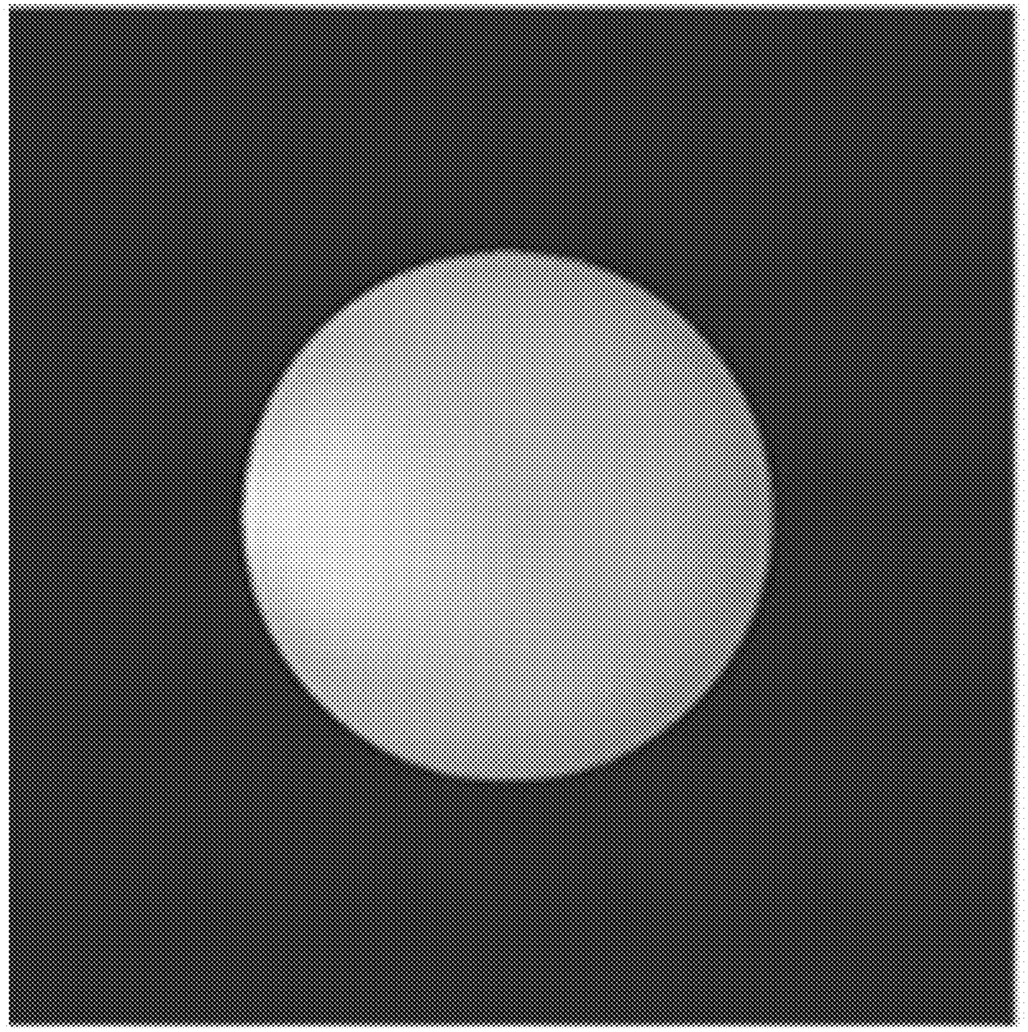
Figure 8A:
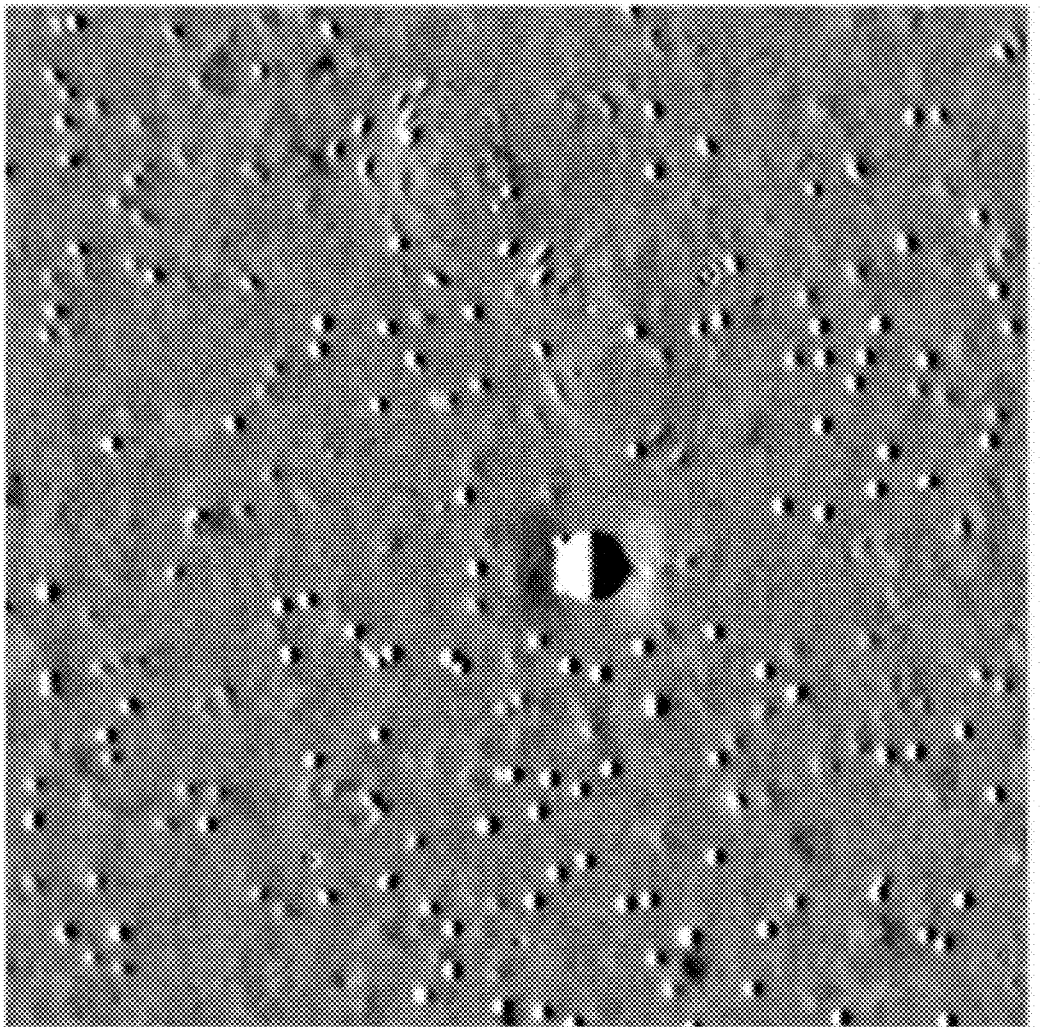
FIGS. 8A, 8B, and 8C are views for illustrating a transfer function generator and an intermediate image generator in a microscope enabling differential phase contrast imaging of oblique focal plane according to the present disclosure.
Figure 8B:
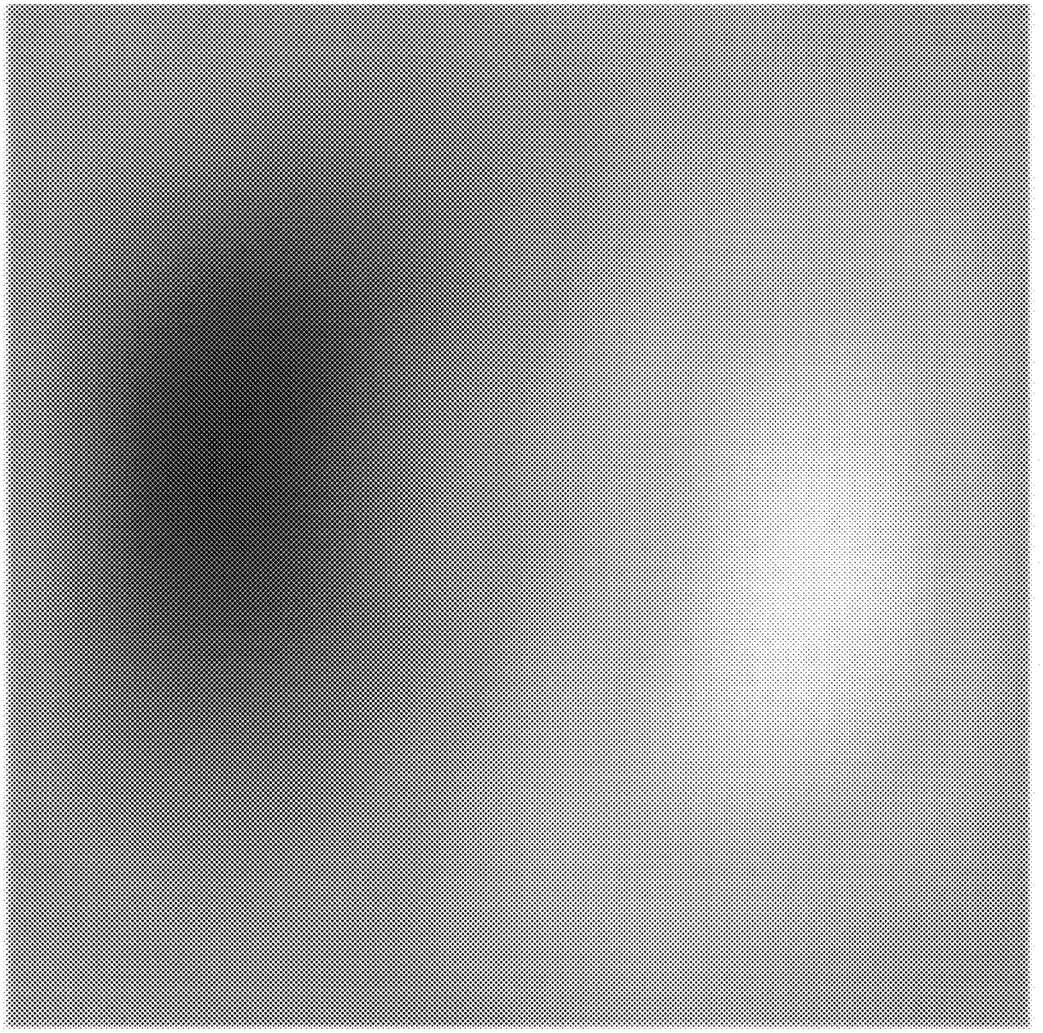
Figure 8C:
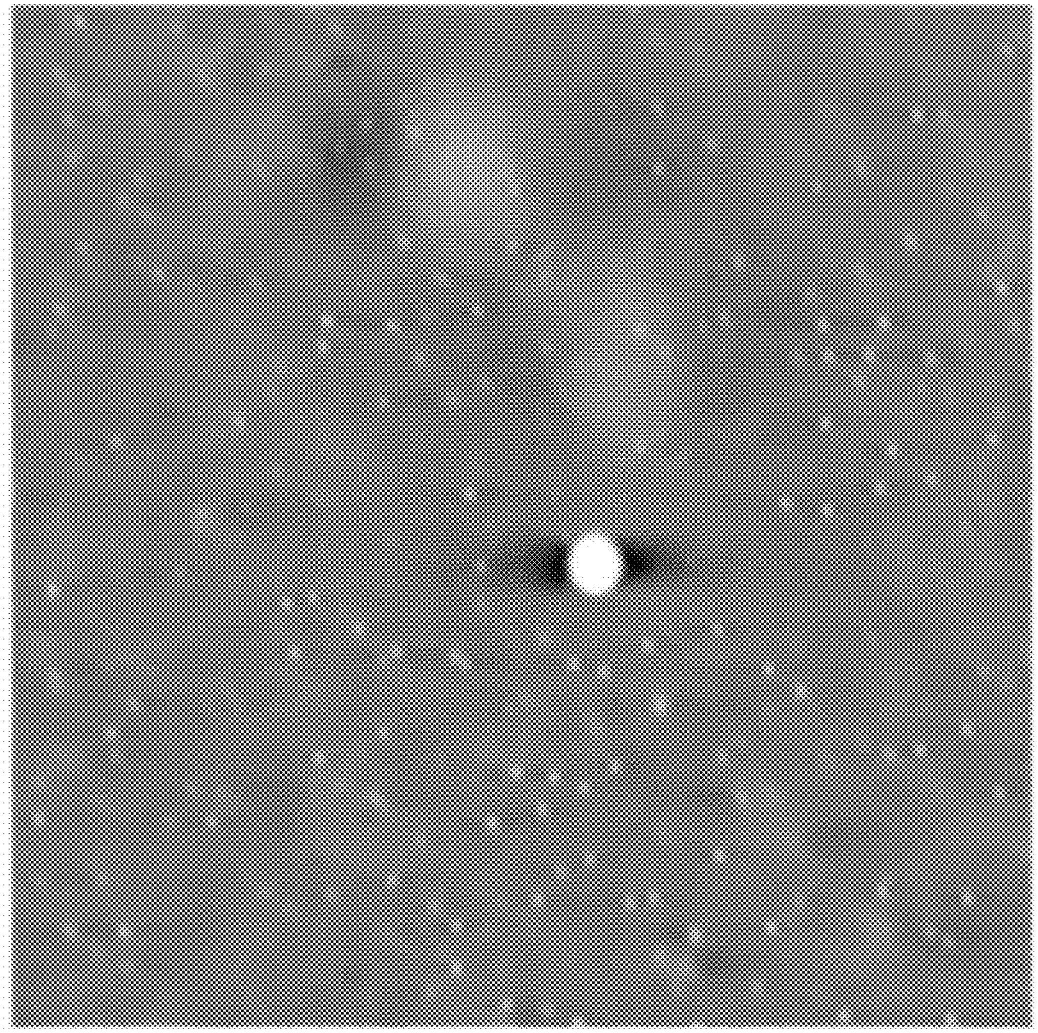
Figure 9A:
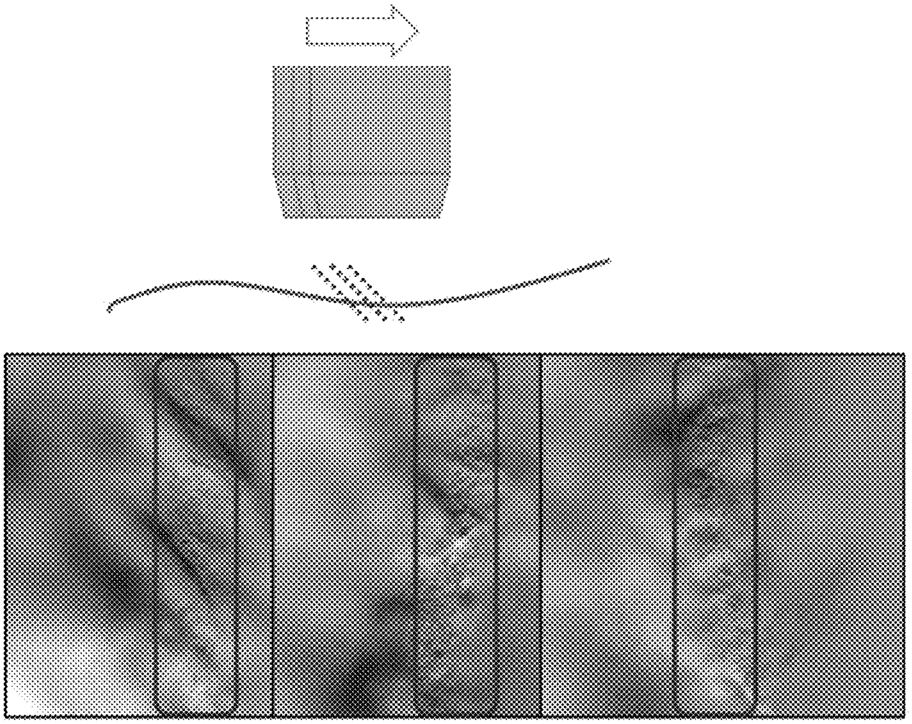
FIGS. 9A and 9B are views for illustrating a final image generator of a microscope enabling differential phase contrast imaging of oblique focal plane according to the present disclosure.
Figure 9B:
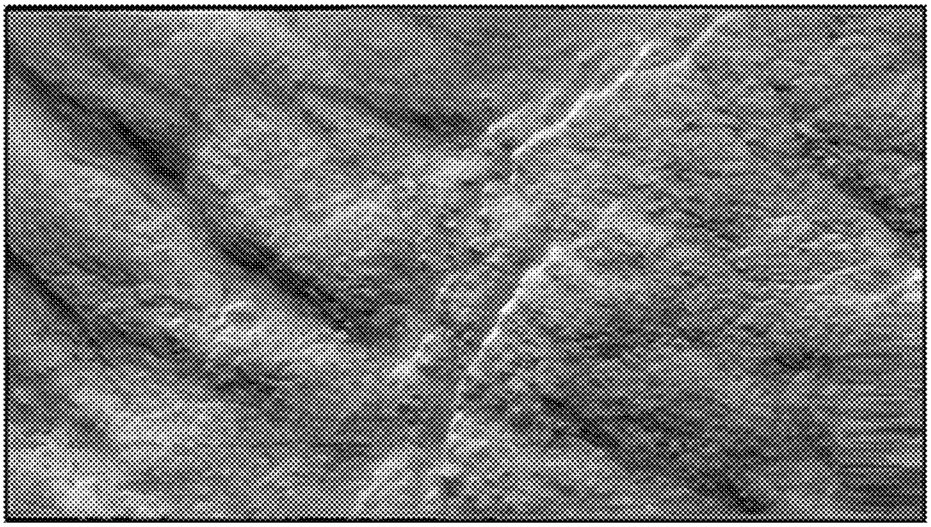
Figure 10A:
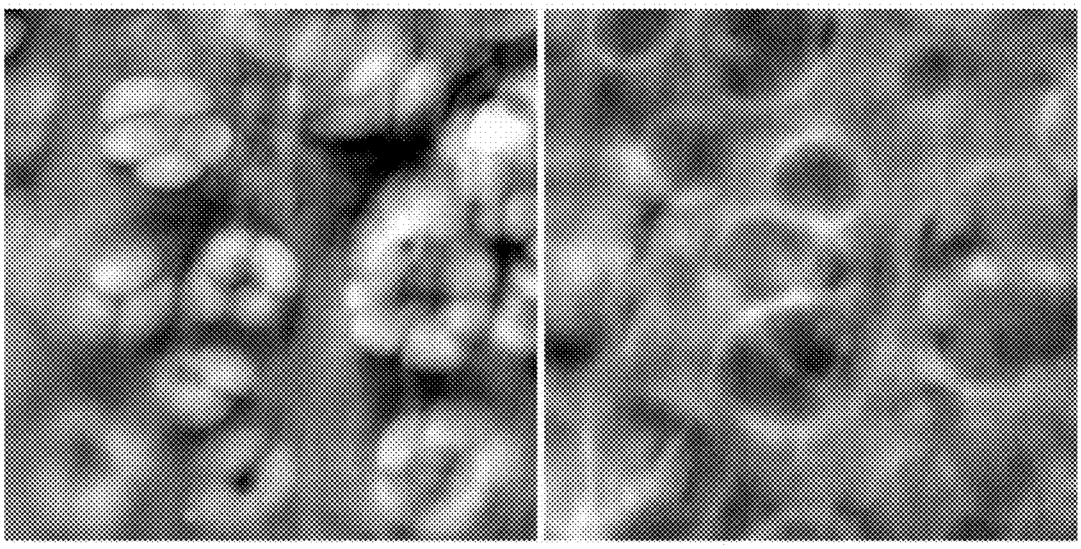
FIGS. 10A and 10B are views for illustrating a differential phase contrast (DPC) image with high contrast obtained through a microscope enabling differential phase contrast imaging of oblique focal plane according to the present disclosure and identifiable information thereby.
Figure 10B:
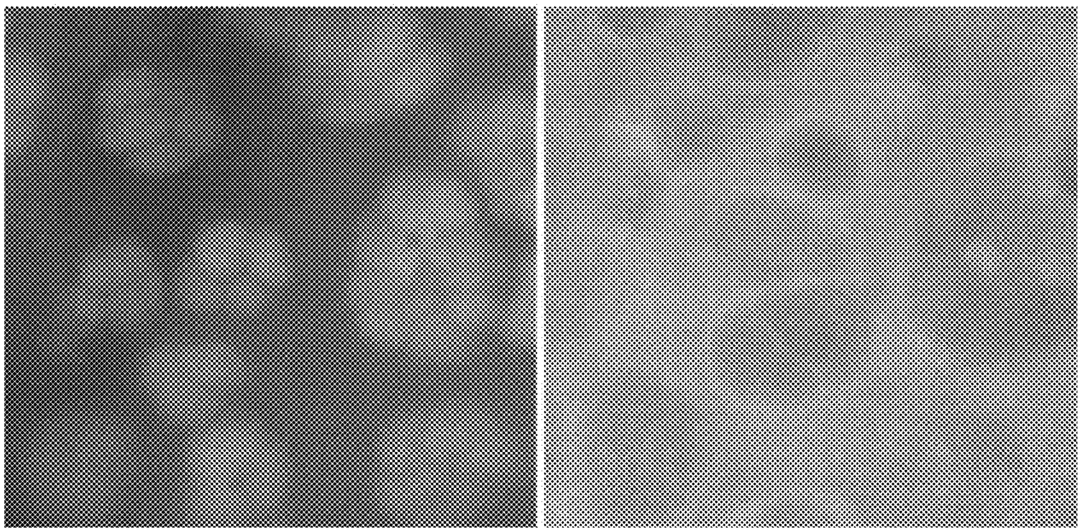
Figure 11:
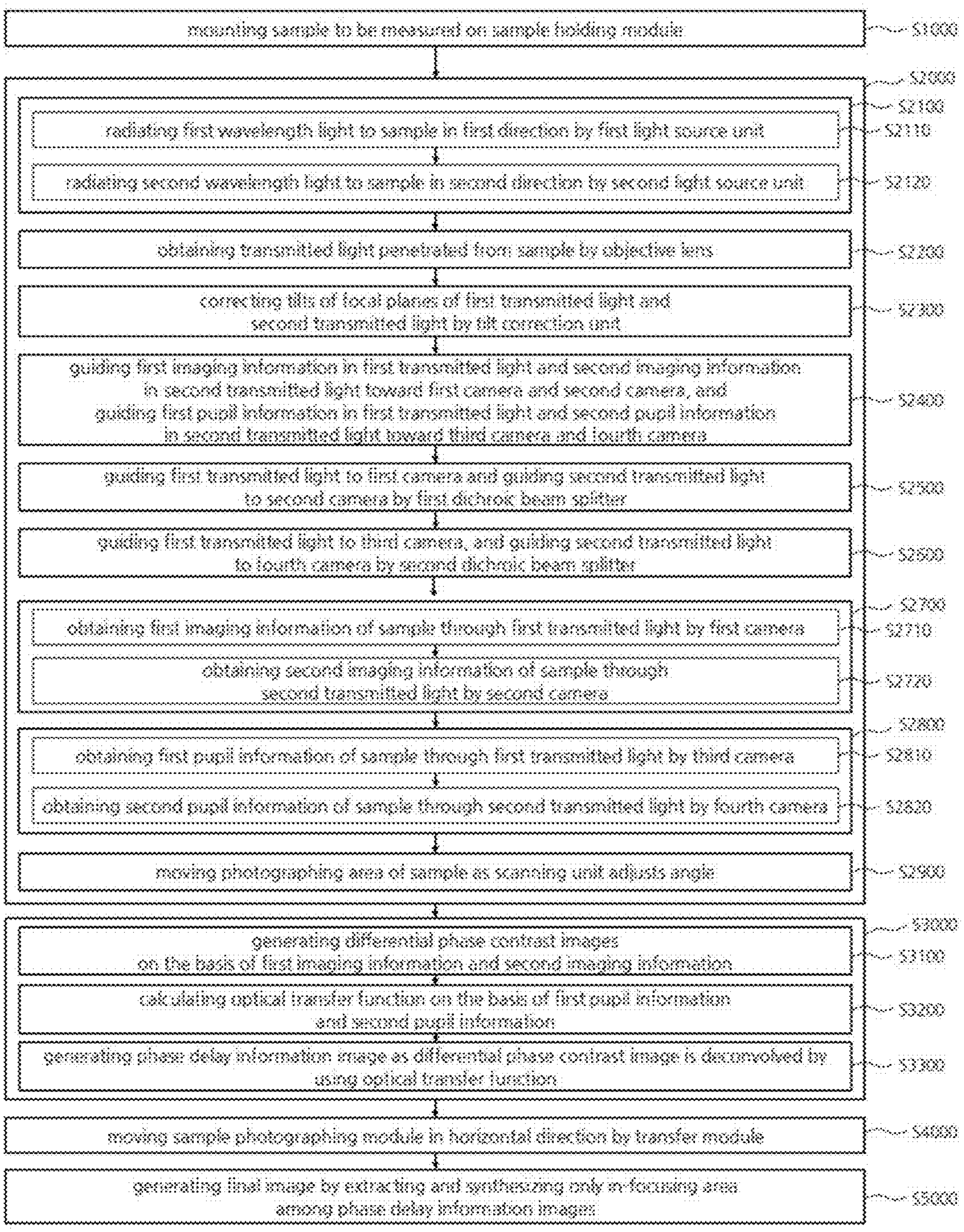
FIG. 11 is a view for illustrating steps of a method for operating a microscope enabling differential phase contrast imaging of oblique focal plane according to the present disclosure.
Figure 12:
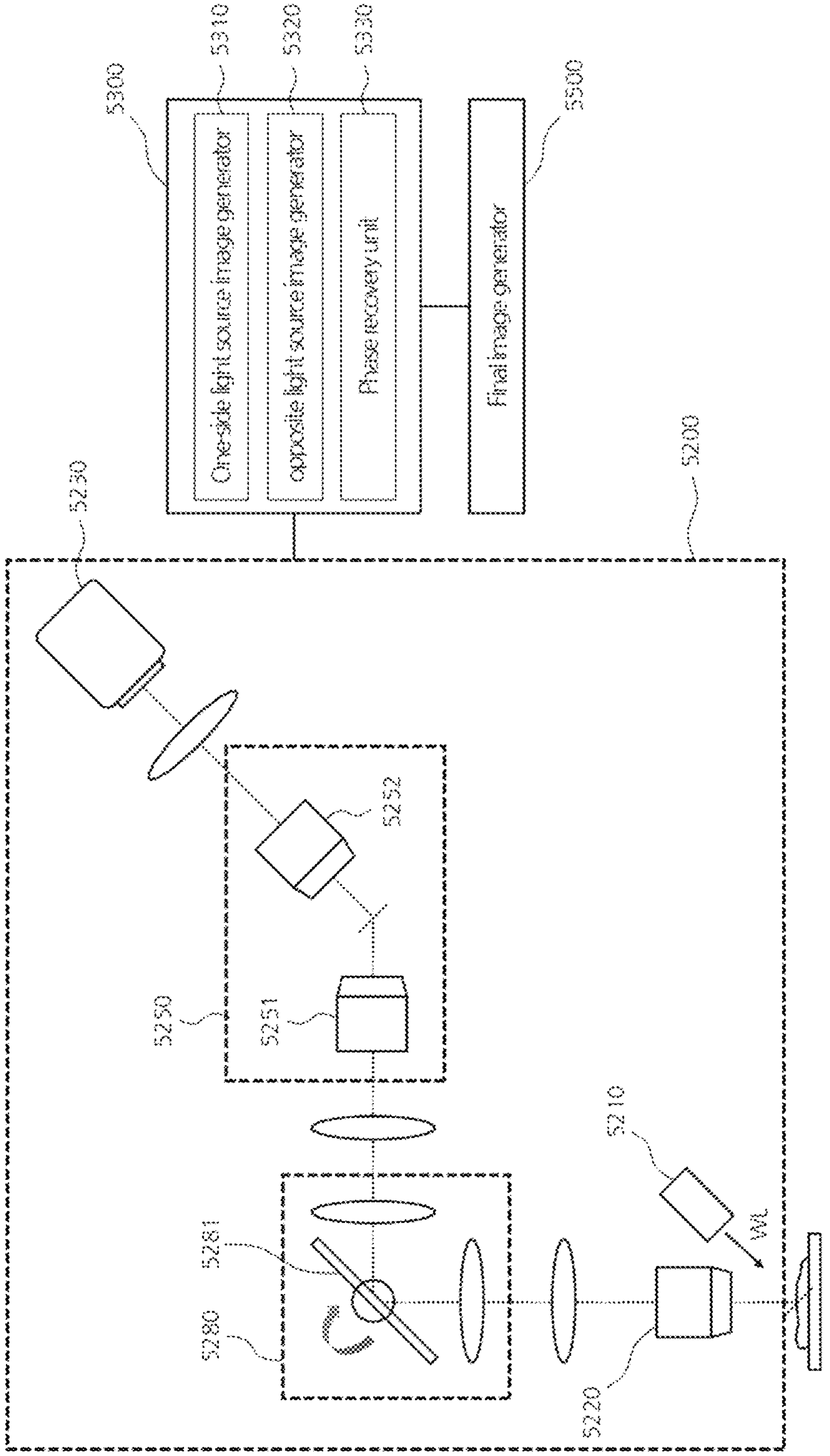
FIG. 12 is a view showing a fifth exemplary embodiment of a microscope enabling differential phase contrast imaging of oblique focal plane according to the present disclosure.
Figure 13:
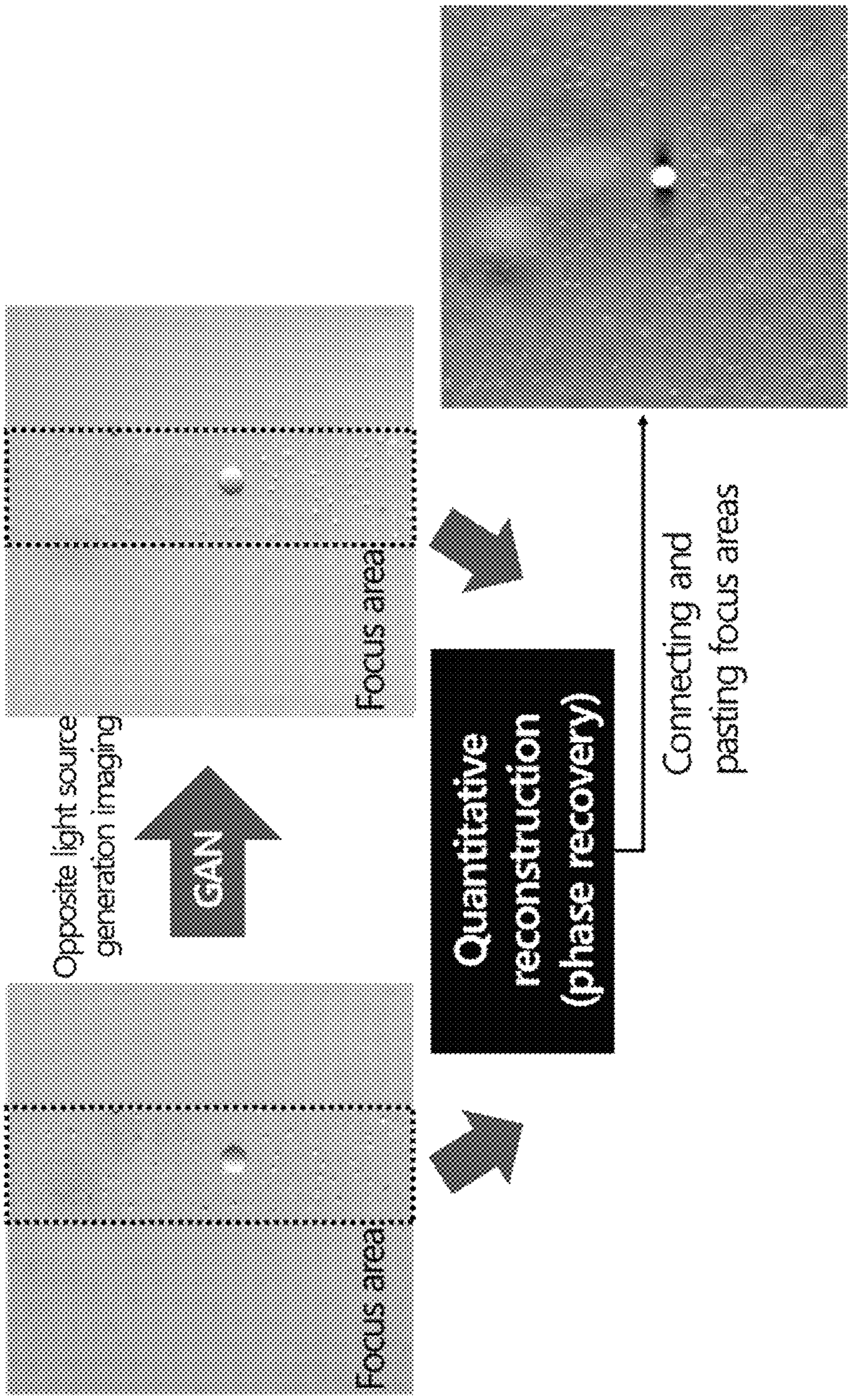
FIG. 13 is a view showing an example of a final image generator of a fifth exemplary embodiment of a microscope enabling differential phase contrast imaging of oblique focal plane according to the present disclosure.
Figure 14:
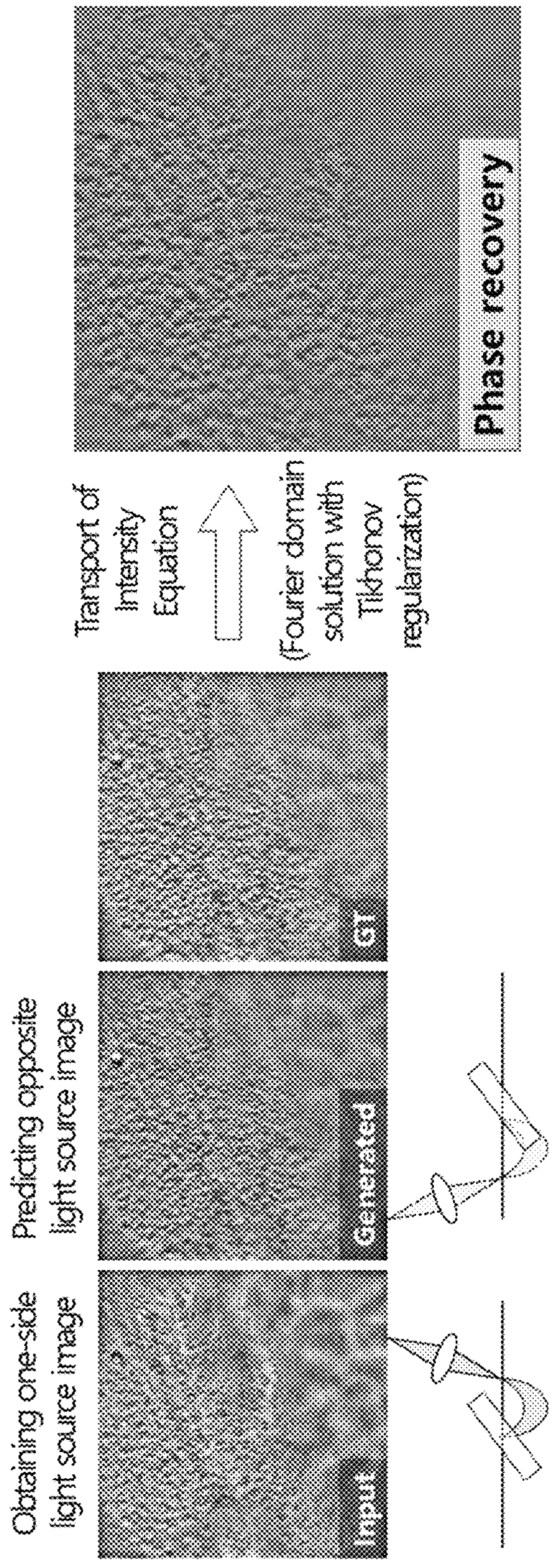
FIG. 14 is a view showing an example of a final image generated by a microscope enabling differential phase contrast imaging of oblique focal plane according to the present disclosure.
Figure 15:
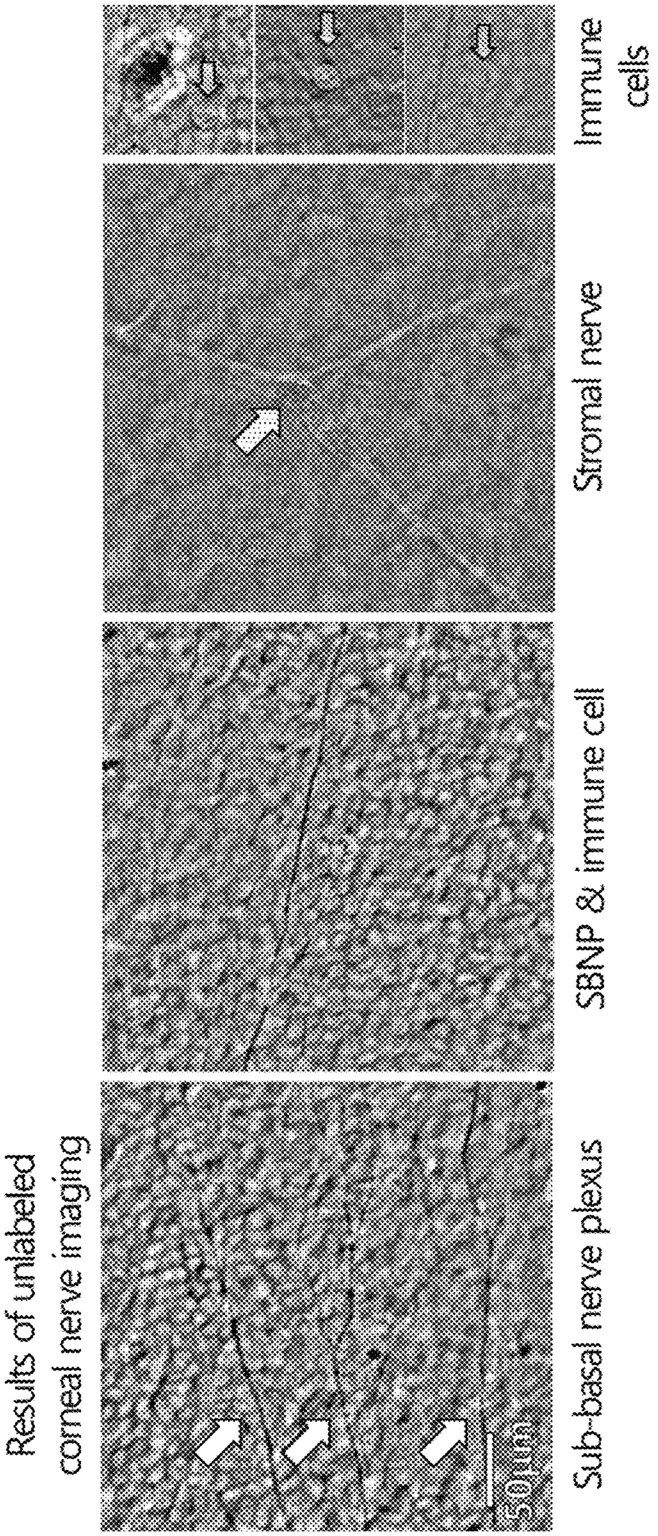
FIG. 15 is a view showing an example of an image obtained through a label-free method by using a microscope enabling differential phase contrast imaging of oblique focal plane according to the present disclosure.

FIG. 1 is a view showing a first exemplary embodiment of a microscope enabling differential phase contrast imaging of oblique focal plane according to the present disclosure, FIG. 2 is a view showing a second exemplary embodiment of a microscope enabling differential phase contrast imaging of oblique focal plane according to the present disclosure, FIG. 3 is a view showing a third exemplary embodiment of a microscope enabling differential phase contrast imaging of oblique focal plane according to the present disclosure, FIG. 4 is a view showing a fourth exemplary embodiment of a microscope enabling differential phase contrast imaging of oblique focal plane according to the present disclosure, FIGS. 5A and 5B are views showing an example of a first imaging information obtained by a first camera and a second imaging information obtained by a second camera in a microscope enabling differential phase contrast imaging of oblique focal plane according to the present disclosure, FIG. 6 is a view showing an example of a differential phase contrast image generated by a differential phase contrast image generator on the basis of a first imaging information and a second imaging information in a microscope enabling differential phase contrast imaging of oblique focal plane according to the present disclosure, FIGS. 7A and 7B are views showing an example of a third imaging information obtained by a third camera and a fourth imaging information obtained by a fourth camera in a microscope enabling differential phase contrast imaging of oblique focal plane according to the present disclosure, FIGS. 8A, 8B, and 8C are views for illustrating a transfer function generator and an intermediate image generator in a microscope enabling differential phase contrast imaging of oblique focal plane according to the present disclosure, FIGS. 9A and 9B are views for illustrating a final image generator of a microscope enabling differential phase contrast imaging of oblique focal plane according to the present disclosure, FIGS. 10A and 10B are views for illustrating a differential phase contrast (DPC) image with high contrast obtained through a microscope enabling differential phase contrast imaging of oblique focal plane according to the present disclosure and identifiable information thereby, FIG. 11 is a view for illustrating steps of a method for operating a microscope enabling differential phase contrast imaging of oblique focal plane according to the present disclosure, FIG. 12 is a view showing a fifth exemplary embodiment of a microscope enabling differential phase contrast imaging of oblique focal plane according to the present disclosure, FIG. 13 is a view showing an example of a final image generator of a fifth exemplary embodiment of a microscope enabling differential phase contrast imaging of oblique focal plane according to the present disclosure, FIG. 14 is a view showing an example of a final image generated by a microscope enabling differential phase contrast imaging of oblique focal plane according to the present disclosure, and FIG. 15 is a view showing an example of an image obtained through a label-free method by using a microscope enabling differential phase contrast imaging of oblique focal plane according to the present disclosure.

First, a microscope enabling differential phase contrast imaging of oblique focal plane according to the present disclosure will be described with reference to FIGS. 1 to 10B as follows.

FIG. 1 is a view schematically showing a first exemplary embodiment of a microscope enabling differential phase contrast imaging of oblique focal plane according to the present disclosure, and the first exemplary embodiment of the microscope enabling differential phase contrast imaging of oblique focal plane according to the present disclosure may include a sample holding module 1100, a sample photographing module 1200, an imaging generator 1300, a transfer module 1400, a final image generator 1500, and a lens group.

Herein, the lens group may include a plurality of lenses, each of which is disposed in at least one of a front surface and a rear surface of the sample holding module 1100, the sample photographing module 1200, the imaging generator 1300, the transfer module 1400, and the final image generator 1500, and may perform a magnification and focus adjustment of wavelength light and transmitted light to be described later.

The sample holding module 1100 may be mounted with a sample such as a cell that a user checks.

In this case, when the sample photographing module 1200 of the microscope enabling differential phase contrast imaging of oblique focal plane according to the present disclosure directly photographs the skin of a human or animal, the sample holding module 1100 can be omitted, and the presence or absence of the sample holding module 1100 may be determined depending on a target which a user is intended to use, so the sample photographing module 1200 of the microscope enabling differential phase contrast imaging of oblique focal plane according to the present disclosure may photograph a sample of a specimen collected from a human or animal for convenience of explanation in the present specification.

The sample photographing module 1200 may photograph the sample and, specifically, the sample photographing module 1200 may include a light source unit 1210, an objective lens 1220, a tilt correction unit 1250, a beam splitter 1260, a first dichroic beam splitter 1240, an imaging information acquisition unit 1230, and a pupil information acquisition unit 1270.

The light source unit 1210 may radiate light in order to photograph the sample, and the light source unit 1210 may include a first light source unit 1211 and a second light source unit 1212.

The first light source unit 1211 may radiate a first wavelength light (WL1) to the sample in a first direction.

The second light source unit 1212 may radiate to the sample a second wavelength light (WL2) having a wavelength band different from the first wavelength light in a second direction different from the first direction.

At this time, it may be preferable that the first wavelength light and the second wavelength light are in close wavelength bands, and as the first light source unit 1211 and the second light source unit 1212 radiate to the sample the first wavelength light and the second wavelength light that are wavelength bands different from each other, two images according to wavelength bands may be obtained, a description about which will be described later.

In addition, the first wavelength light and the second wavelength light may be focused toward a tilted plane in the sample, and an imaging surface obtained from the transmitted light from the focal plane of the sample may be also tilted at a predetermined angle with respect to a central axis of the objective lens 1220.

The transmitted light may be described as follows.

The illumination light radiated from the light source unit may irradiate the edge of the sample to be visualized, and the radiated illumination light may be scattered within the sample, such that some of the scattered light may be directed toward an imaging acquisition field of view (FOV) (i.e., toward the imaging acquisition module) and may be transmitted through the sample. This transmitted light may be utilized as oblique illumination light for visualization.

The objective lens 1220 may be disposed to face the sample, and the first wavelength light and the second wavelength light may pass through and irradiate the sample, and the first transmitted light and the second transmitted light to be described later may pass through the objective lens 1220 and move to the tilt correction unit 1250.

The tilt correction unit 1250 may be disposed between the objective lens 1220 and the first dichroic beam splitter 1240, and may correct the tilts of the focal planes of the first transmitted light and the second transmitted light and, specifically, the tilt correction unit 1250 may include a correction mirror 1251, a first signal transmission objective lens 1252, and a pre-beam splitter 1253.

The pre-beam splitter 1253, the first signal transmission objective lens 1252, and the correction mirror 1251 may be disposed in the order based on a traveling direction of the first transmitted light and the second transmitted light passing through the objective lens 1220, and the pre-beam splitter 1253 may guide the first transmitted light and the second transmitted light obtained from the objective lens 1220 to the correction mirror 1251 and guide to the beam splitter 1260 the first transmitted light and the second transmitted light from the correction mirror 1251 and obtained from the first signal transmission objective lens 1252.

The correction mirror 1251 may correct the tilts of the focal planes of the first transmitted light and the second transmitted light obtained from the objective lens 1220.

That is, the correction mirror 1251 may be disposed to be tilted as much as the tilts of the focal planes of the first transmitted light and the second transmitted light and may correct flat the focal planes of the first transmitted light and the second transmitted light from the correction mirror 1251.

The first signal transmission objective lens 1252 may obtain the first transmitted light and the second transmitted light whose focal planes are corrected in the correction mirror 1251 and may guide the same to the pre-beam splitter 1253.

The beam splitter 1260 may be disposed among the objective lens 1220, the imaging information acquisition unit 1230, and the pupil information acquisition unit 1270, and may guide a first imaging information in the first transmitted light and a second imaging information in the second transmitted light toward the imaging information acquisition unit 1230, and may guide a first pupil information in the first transmitted light and a second pupil information in the second transmitted light toward a pupil information acquisition unit 1270.

The first dichroic beam splitter 1240 may be disposed between the objective lens 1220 and the imaging information acquisition unit 1230, and may guide the first transmitted light to the first camera 1231 of the imaging information acquisition unit 1230, and guide the second transmitted light to the second camera 1232 of the imaging information acquisition unit 1230.

The imaging information acquisition unit 1230 may obtain imaging information of the sample through the transmitted light, and may include a first camera 1231 and a second camera 1232.

The first camera 1231 may obtain the first imaging information of the sample from the sample through the first transmitted light, the transmitted light of the first wavelength light.

The second camera 1232 may obtain the second imaging information of the sample from the sample through the second transmitted light, the transmitted light of the second wavelength light.

That is, the first camera 1231 may obtain the first imaging information from the first transmitted light from the sample as shown in FIG. 5A, and the second camera 1232 may obtain the second imaging information from the second transmitted light from the sample as shown in FIG. 5B.

The pupil information acquisition unit 1270 may obtain pupil information of the sample through the transmitted light, and the pupil information acquisition unit 1270 may include a third camera 1271, a fourth camera 1272, and a second dichroic beam splitter 1273.

Before describing the third camera 1271 and the fourth camera 1272, the second dichroic beam splitter 1273 may be disposed among the beam splitter 1260, the third camera 1271, and the fourth camera 1272, and may guide the first transmitted light to the third camera 1271 and guide the second transmitted light to the fourth camera 1272.

The third camera 1271 may obtain the first pupil information of the sample through the first transmitted light, and the fourth camera 1272 may obtain the second pupil information of the sample through the second transmitted light.

That is, the third camera 1271 may obtain the second pupil information from the first transmitted light from the sample as shown in FIG. 7A, and the second camera 1232 may obtain the second pupil information from the second transmitted light from the sample as shown in FIG. 7B.

The imaging generator 1300 may generate a sample imaging on the basis of the image of the sample photographed in the sample photographing module 1200 and, specifically, the imaging generator 1300 may include a differential phase contrast image generator 1310, a transfer function generator 1320, and an intermediate image generator 1330.

The differential phase contrast image generator 1310 may generate a differential phase contrast (DPC) image on the basis of the first imaging information and the second imaging information.

That is, as shown in FIG. 6, the differential phase contrast image generator 1310 may generate a differential phase contrast image with improved contrast by subtracting intensity information of the other remaining imaging information from one imaging information of the first imaging information and the second imaging information respectively obtained from the first camera 1231 and the second camera 1232.

The transfer function generator 1320 may calculate an optical transfer function (OTF) on the basis of the first pupil information and the second pupil information.

That is, as shown in FIG. 8B, the transfer function generator 1320 may calculate the optical transfer function by using the first pupil information and the second pupil information obtained from the third camera 1271 and the fourth camera 1272 respectively.

As shown in FIGS. 8A, 8B and 8C, the intermediate image generator 1330 may enable quantitative physical states of the cell to be additionally identified by generating a phase delay information image as shown in FIG. 8C, as the differential phase contrast image (FIG. 8A) is deconvolved by using the optical transfer function (FIG. 8B).

The transfer module 1400 may be coupled to the sample photographing module 1200 and may move the sample photographing module 1200 in a horizontal direction with respect to the sample as shown in FIG. 9A.

That is, as described above, the sample photographing module 1200 may photograph the sample and generate all phase delay images, and then the transfer module 1400 may move the photographing area of the sample where the sample photographing module 1200 photographs as the sample photographing module 1200 is moved.

Thereafter, the sample photographing module 1200 may enable imaging a sample of a large area as an altered photographing area of the sample is photographed.

At this time, the transfer module 1400 is shown to be coupled to the sample photographing module 1200 in the present specification, but the transfer module 1400 may be coupled to at least one of the sample holding module 1100 and the sample photographing module 1200 so that the photographing area of the sample can be moved by transferring at least one of the sample holding module 1100 and the sample photographing module 1200, and this can vary depending on various conditions such as the size and target of the sample to be photographed.

The final image generator 1500 may generate a final image by extracting and synthesizing only an in-focusing area among the phase delay information images as shown in FIG. 9B, when multiple phase delay information images are obtained altering the photographing area of the sample as the transfer module 1400 operates.

Accordingly, it may be possible to obtain an image where a sample of a large area is all in-focusing.

FIGS. 10A and 10B are images obtained by photographing the same area of a conjunctival goblet cell of a mouse in a different way, and FIG. 10A is a differential phase contrast (DPC) image with high contrast obtained through the microscope enabling differential phase contrast imaging of oblique focal plane according to the present disclosure and FIG. 10B is a comparable image photographed after the cell is fluorescently stained.

As shown in FIGS. 10A and 10B, the image obtained through the microscope enabling differential phase contrast imaging of oblique focal plane according to the present disclosure not only may provide the same information as that provided by a conventional fluorescence microscope, but also may allow to additionally identify quantitative physical states of the cell.

Next, a second exemplary embodiment of a microscope enabling differential phase contrast imaging of oblique focal plane according to the present disclosure will be described with reference to FIG. 2 as follows.

The second exemplary embodiment of a microscope enabling differential phase contrast imaging of oblique focal plane according to the present disclosure may include a sample holding module 2100, a sample photographing module 2200, an imaging generator 2300, a final image generator 2500, and a lens group.

At this time, the second exemplary embodiment of a microscope enabling differential phase contrast imaging of oblique focal plane according to the present disclosure may not include the transfer module 1400 included in the first exemplary embodiment of a microscope enabling differential phase contrast imaging of oblique focal plane according to the present disclosure described above, and the sample photographing module 2200 may include a scanning unit 2280.

The scanning unit 2280 may be disposed between the objective lens 2220 and the tilt correction unit 2250, and the scanning unit 2280 may include a scan mirror 2281 and lenses.

As the scan mirror 2281 adjusts an angle, the photographing area of the sample may be moved, such that a sample of a large area may be photographed without moving the sample photographing module 2200.

In addition, the sample holding module 2100, the sample photographing module 2200, the imaging generator 2300, the final image generator 2500, and the lens group included in the second exemplary embodiment of a microscope enabling differential phase contrast imaging of oblique focal plane according to the present disclosure may correspond to the sample holding module 1100, the sample photographing module 1200, the imaging generator 1300, the final image generator 1500, and the lens group included in the first exemplary embodiment of a microscope enabling differential phase contrast imaging of oblique focal plane according to the present disclosure, and thus the description thereof may be omitted.

Next, a third exemplary embodiment of a microscope enabling differential phase contrast imaging of oblique focal plane according to the present disclosure will be described with reference to FIG. 3 as follows.

The third exemplary embodiment of a microscope enabling differential phase contrast imaging of oblique focal plane according to the present disclosure may include a sample holding module 3100, a sample photographing module 3200, an imaging generator 3300, a transfer module 3400, a final image generator 3500, and a lens group.

In this case, a tilt correction unit 3250 included in the sample photographing module 3200 may include a second signal transmission objective lens 3251 and a third signal transmission objective lens 3252.

The second signal transmission objective lens 3251 may transmit the first transmitted light and the second transmitted light obtained from the objective lens 3220 to the third signal transmission objective lens 3252.

The third signal transmission objective lens 3252 may obtain the first transmitted light and the second transmitted light from the second signal transmission objective lens 3251, and may be disposed to be tilted at a predetermined angle from the second signal transmission objective lens 3251 in order to correct the tilts of the focal planes of the first transmitted light and the second transmitted light.

That is, with respect to the second signal transmission objective lens 3251, the third signal transmission objective lens 3252 may be disposed to be tilted as much as the tilts of the focal planes of the first transmitted light and the second transmitted light, resulting in correcting flat the focal planes of the first transmitted light and the second transmitted light.

In addition, the sample holding module 3100, the sample photographing module 3200, the imaging generator 3300, the transfer module 3400, the final image generator 3500, and the lens group included in the third exemplary embodiment of a microscope enabling differential phase contrast imaging of oblique focal plane according to the present disclosure may correspond to the sample holding module 1100, the sample photographing module 1200, the imaging generator 1300, the transfer module 1400, the final image generator 1500, and the lens group included in the first exemplary embodiment of a microscope enabling differential phase contrast imaging of oblique focal plane according to the present disclosure described above, and thus the description thereof may be omitted.

Next, a fourth exemplary embodiment of a microscope enabling differential phase contrast imaging of oblique focal plane according to the present disclosure will be described with reference to FIG. 4 as follows.

The fourth exemplary embodiment of a microscope enabling differential phase contrast imaging of oblique focal plane according to the present disclosure may include a sample holding module 4100, a sample photographing module 4200, an imaging generator 4300, a final image generator 4500, and a lens group.

At this time, the sample photographing module 4200 may include a scanning unit 4280, which corresponds to the description in the second exemplary embodiment of a microscope enabling differential phase contrast imaging of oblique focal plane according to the present disclosure described above.

In addition, a tilt correction unit 4250 included in the sample photographing module 4200 may include a second signal transmission objective lens 4251 and a third signal transmission objective lens 4252, which corresponds to the description in the third exemplary embodiment of a microscope enabling differential phase contrast imaging of oblique focal plane according to the present disclosure described above.

In addition, the description of the sample holding module 4100, the sample photographing module 4200, the imaging generator 4300, the final image generator 4500, and the lens group of the fourth exemplary embodiment of a microscope enabling differential phase contrast imaging of oblique focal plane according to the present disclosure may correspond to the description of the sample holding module 2100, the sample photographing module 2200, the imaging generator 2300, the final image generator 2500, and the lens group of the second exemplary embodiment of a microscope enabling differential phase contrast imaging of oblique focal plane according to the present disclosure described above, and thus the description thereof may be omitted.

Next, a method for operating a microscope enabling differential phase contrast imaging of oblique focal plane according to the present disclosure will be described with reference to FIG. 11 as follows.

The method for operating a microscope enabling differential phase contrast imaging of oblique focal plane according to the present disclosure may include a sample holding step (S1000), a sample photographing step (S2000), an imaging generation step (S3000), a transfer step (S4000), and a final image generation step (S5000).

In the sample holding step (S1000), a sample to be measured may be mounted on the sample holding module 1100.

In the sample photographing step (S2000), the sample photographing module 1200 may photograph the sample, and the sample photographing step (S2000) may include a light radiation step (S2100), a transmitted light acquisition step (S2200), a tilt correction step (S2300), an information separation step (S2400), an imaging information guide step (S2500), a pupil information guide step (S2600), an imaging information acquisition step (S2700), and a pupil information acquisition step (S2800).

The light radiation step (S2100) may allow the light source unit 1210 to radiate light to the sample, and may include a first light radiation step (S2100) for radiating a first wavelength light to the sample in a first direction by a first light source unit 1211 and a second light radiation step (S2100) for radiating a second wavelength light to the sample in a second direction by a second light source unit 1212.

In the transmitted light acquisition step (S2200), the objective lens 1220 may obtain the transmitted light from the sample.

In the tilt correction step (S2300), the tilt correction unit 1250 disposed among the objective lens 1220, the first camera 1231, and the second camera 1232 may correct the tilts of the focal planes of the first transmitted light and the second transmitted light after the transmitted light acquisition step (S2200).

In this case, the tilt correction step (S2300) may include a first guide step, a mirror correction step, a first signal transmission step, and a second guide step as a first exemplary embodiment.

In the first guide step, the pre-beam splitter 1253 may guide the first transmitted light and the second transmitted light obtained from the objective lens 1220 to a correction mirror 1251 formed with a tilt of a predetermined angle.

In the mirror correction step, the correction mirror 1251 may correct the tilts of the focal planes of the first transmitted light and the second transmitted light obtained from the objective lens 1220.

In the first signal transmission step, the first transmitted light and the second transmitted light whose focal planes are corrected by the correction mirror 1251 may be obtained in the first signal transmission objective lens 1252.

In the second guide step, the pre-beam splitter 1253 may guide the first transmitted light and the second transmitted light obtained from the first signal transmission objective lens 1252 to the first dichroic beam splitter 1240.

Alternatively, the tilt correction step (S2300) may include a first transmission step and a second transmission step as a second exemplary embodiment.

In the first transmission step, the first transmitted light and the second transmitted light obtained from the objective lens 1220 may move to the second signal transmission objective lens 3251.

Thereafter, in the second transmission step, the third signal transmission objective lens 3252 may obtain the first transmission light and the second transmission light from the second signal transmission objective lens 3251.

In this case, in the second transmission step, the third signal transmission objective lens 3252 may be disposed to be tilted at a predetermined angle from the second signal transmission objective lens 3251 in order to correct the tilts of the focal planes of the first transmission light and the second transmission light.

In the information separation step (S2400), the beam splitter 1260 may guide the first imaging information in the first transmitted light and the second imaging information in the second transmitted light toward the first camera 1231 and the second camera 1232, and may guide the first pupil information in the first transmitted light and the second pupil information in the second transmitted light toward the third camera 1271 and the fourth camera 1272, after the tilt correction step (S2300).

In the imaging information guide step (S2500), the first dichroic beam splitter 1240 disposed among the tilt correction unit 1250, the first camera 1231 and the second camera 1232 may guide the first transmitted light to the first camera 1231, and may guide the second transmitted light to the second camera 1232.

In the pupil information guide step (S2600), the second dichroic beam splitter 1273 disposed between the third camera 1271 and the fourth camera 1272 may guide the first transmitted light to the third camera 1271, and may guide the second transmitted light to the fourth camera 1272.

In the imaging information acquisition step (S2700), the imaging information acquisition unit 1230 may obtain the imaging information of the sample through the transmitted light, the first camera 1231 may obtain the first imaging information of the sample through the first transmitted light, the transmitted light of the first wavelength light, and the second camera 1232 may obtain the second imaging information of the sample through the second transmitted light, the transmitted light of the second wavelength light.

The pupil information acquisition step (S2800) may allow the pupil information acquisition unit 1270 to obtain pupil information of the sample through the transmitted light, and may include a first pupil information acquisition step (S2810) for obtaining a first pupil information of the sample through the first transmitted light by the third camera 1271, and a second pupil information acquisition step (S2820) for obtaining the second pupil information of the sample through the second transmitted light by the fourth camera 1272.

The sample photographing step (S2000) may further include a scanning unit rotation step (S2900) and, in the scanning unit rotation step (S2900), the photographing area of the sample may be moved as the scanning unit 2280 disposed between the objective lens 1220 and the tilt correction unit 1250 adjusts an angle after the imaging information guide step (S2500).

In this case, when the scanning unit rotation step (S2900) is performed, the transfer step (S4000) to be described later may be omitted and, when the transfer step (S4000) is performed, the scanning unit rotation step (S2900) may be omitted.

The imaging generation step (S3000) may allow the imaging generator 1300 to generate a sample imaging on the basis of an image of the sample photographed in the sample photographing module 1200, and may include a differential phase contrast image generation step (S3100), a transfer function generation step (S3200), and an intermediate image generation step (S3300).

In the differential phase contrast image generation step (S3100), the differential phase contrast image generator 1310 may generate the differential phase contrast images on the basis of the first imaging information and the second imaging information.

In the transfer function generation step (S3200), the transfer function generator 1320 may calculate an optical transfer function on the basis of the first pupil information and the second pupil information.

In the intermediate image generation step (S3300), the intermediate image generator 1330 may generate a phase delay information image as the differential phase contrast image is deconvolved by using the optical transfer function.

In the transfer step (S4000), the transfer module 1400 coupled to the sample photographing module 1200 may move the sample photographing module 1200 in the horizontal direction after the imaging generation step (S3000).

In the final image generation step (S5000), the final image generator 1500 may generate a final image by extracting and synthesizing only an in-focusing area among the phase delay information images when there are multiple phase delay information images.

In addition, a detailed description of the method for operating a microscope enabling differential phase contrast imaging of oblique focal plane according to the present disclosure may correspond to that of a microscope enabling differential phase contrast imaging of oblique focal plane according to the present disclosure described above, and thus a description thereof will be omitted.

Meanwhile, a fifth exemplary embodiment of a microscope enabling differential phase contrast imaging of oblique focal plane according to the present disclosure will be described with reference to FIG. 12 as follows.

The fifth exemplary embodiment may present a configuration of a microscope achieving the same or similar effects by using only one camera for obtaining imaging information among the two cameras (a first camera, a second camera) and two pupil cameras (a third camera, a fourth camera) used in the first to fourth exemplary embodiments.

In this case, the light source unit may be equipped with only one of the first light source unit or the second light source unit, and the imaging information acquisition unit 5230 for obtaining imaging information may be equipped with only one camera, thereby greatly improving the size, cost, time, and the like of a device.

The microscope enabling differential phase contrast imaging of oblique focal plane according to the fifth exemplary embodiment may include a sample photographing module 5200, an imaging generator 5300, and a final image generator 5500.

The sample photographing module 5200 may photograph the sample and, specifically, the sample photographing module 5200 may include a light source unit 5210, an objective lens 5220, a scanning unit 5280, a tilt correction unit 5250, and an imaging information acquisition unit 5230.

The light source unit 5210 may radiate light in order to photograph the sample, and the light source unit 5210 may include a single light source forming a predetermined angle with the sample. Referring to the first to fourth exemplary embodiments, only one of the first light source units 1211, 2211, 3211, 4211 and the second light source units 1212, 3212, 4212 may be provided in the fifth exemplary embodiment.

That is, the first light source unit 1211, 2211, 3211, 4211 may radiate the first wavelength light (WL1) to the sample in the first direction, and the second light source unit 1212, 2212, 3212, 4212 may radiate to the sample the second wavelength light (WL2) having a wavelength band different from the first wavelength light in the second direction different from the first direction, and only one of the two may be required.

Accordingly, the first wavelength light or the second wavelength light may be focused a tilted plane of the sample, and an imaging plane obtained from the transmitted light from the focal plane of the sample may be also tilted at a predetermined angle with respect to the central axis of the objective lens 5220.

The objective lens 5220 may be disposed to face the sample, and the penetrating first wavelength light or second wavelength light may irradiate the sample, and the first transmitted light or the second transmitted light may penetrate through the objective lens 5220 and move to the tilt correction unit 5250.

The scanning unit 5280 may have the same function and configuration as the scanning unit 4280 of the fourth exemplary embodiment, and may enable imaging to be obtained by scanning a relatively large area of a sample at high speed through angle adjustment.

The tilt correction unit 5250 may be disposed between the objective lens 5220 and the imaging information acquisition unit 5230 and may include a second signal transmission objective lens 5251 and a third signal transmission objective lens 5252, which corresponds to the description in the third exemplary embodiment and the fourth exemplary embodiment of the microscope enabling differential phase contrast imaging of oblique focal plane according to the present disclosure.

The imaging information acquisition unit 5230 may obtain imaging information of the sample through the transmitted light, and may be composed of one camera. As described above, when the first wavelength light is used in a state where the first light source unit is installed, the imaging information of the sample may be obtained through only the first transmitted light, and when the second wavelength light is used in a state where only the second light source unit is installed, the imaging information of the sample may be obtained through only the second transmitted light. That is, the imaging information acquisition unit 5230 may obtain only a one-side light source image.

The imaging generator 5300 may include a one-side light source image generator 5310, an opposite light source image generator 5320, and a phase recovery unit 5330.

The one-side light source image generator 5310 may generate a one-side light source image by obtaining from the imaging information acquisition unit 5230 the imaging generated by any one of the first light source unit and the second light source unit described above. That is, the one-side light source image obtained while scanning in the scanning unit 5280 may be stored for each focus.

For the final image, an opposite light source image may be also required and, in the fifth exemplary embodiment, the opposite light source image may be generated by using artificial intelligence, that is, a deep learning technology, rather than obtained by the imaging information acquisition unit 5230.

Specifically, the opposite light source image generator 5320 may generate an opposite light source image by using a Pix2pixGAN method, which generates a fake image from the one-side light source image through a generator and determines how close the generated fake image is to the opposite light source image through the discriminator. A training model may be used in the determination and, in the case of the training model, an optimized training model may be generated in a way of comparing opposite light source images actually photographed for training with fake images for training outputted by inputting one-side light source images for training, after actually photographing one-side light source images for training and opposite light source images for training.

As one-side light source images for training and opposite light source images for training are more, more accurate values may be obtained, which means that when only one-side light source images are measured and inputted, opposite light source images can be outputted very close to reality.

The phase recovery unit 5330 may recover the phase from the one-side light source image and the opposite light source image generated (predicted) by the opposite light source image generator 5320 through a transport of intensity equation (TIE) and Tikhonov regularization.

When the phase is recovered, it may be possible to quantitatively analyze the characteristics in the image of the sample and, typically, the three-dimensional shape information of the sample may be identified by the phase information of the image.

The phase recovery procedure may be as follows.

1. Transport of Intensity Equation (TIE):

$$\partial I/\partial z = -\lambda\nabla^2 \phi/4\pi$$

I: intensity
z: depth
λ: wavelength
Ø: phase (to recover)
$\nabla^2$: Laplacian

2. Intensity Difference $$I_{diff} = I_2 - I_1 \approx \partial I/\partial z$$

$I_1$: Acquired image
$I_2$: generated image

3. Phase Recovery on Fourier Domain:

$$\phi(k) = -F(\partial I/\partial z)/2\pi\lambda(K^2 + a)$$

F: Fourier transform $$k^2 = k_x^2 + k_y^2$$

α: regularization parameter (for noise suppression)

4. Inverse Fourier Transform of $\phi(k)$

Basically, the final image generator 5500 may have the same function as the final image generator 1500 of the first exemplary embodiment, and may generate a final image, including the one-side light source image, the generated opposite light source image, and the recovered phase information.

Specifically, referring to FIG. 13, the one-side light source image generator 5310 may store the one-side light source image when the one-side light source image is obtained from the imaging information acquisition unit 5230 and an image matching the focus area is obtained, and the opposite light source image generator 5320 described above may generate the opposite light source image as an image predicted by deep learning, such that the final image is generated by sequentially connecting and pasting each focused image after recovering the phase through the two images by the phase recovery unit 5330.

That is, the final image generator 5500 may generate a final image by cutting and connecting only the focused part of each light source image (each focused position is determined according to the scan).

FIG. 14 is a view showing an example of the overall part and showing a process of obtaining a final image including phase information from a one-side light source image and a generated (predicted by deep learning) opposite light source image.

Meanwhile, when an image is obtained by using a tilt plane scan method in this way, more types of cell images can be obtained universally than those obtained through conventional fluorescent staining.

FIG. 15 is a view showing a cell image obtained according to the present disclosure and, referring to FIG. 15, it may be seen that images can be obtained for a variety of cell types through a label-free method (i.e., without using fluorescent staining or labeling) in addition to conjunctival goblet cells.

As described above, the preferred exemplary embodiments of the present disclosure have been illustrated and described with reference to the drawings, but the present disclosure is not limited to the specific exemplary embodiments described above, and not only various modifications may be possible by those skilled in the art to which the present disclosure belongs without departing from the gist of the present disclosure claimed in the patent claims, but also such modifications should not be understood individually from the technical idea or prospect of the present disclosure.

What is claimed is:

1. A microscope enabling differential phase contrast imaging of oblique focal plane, the microscope comprising:

a sample photographing module for photographing a sample; and an imaging generator for generating a sample imaging on the basis of an image of the sample photographed in the sample photographing module, wherein the sample photographing module comprises:

a light source unit for radiating light to the sample, wherein the light source unit comprises:

a first light source unit for radiating a first wavelength light to the sample in a first direction; and a second light source unit for radiating a second wavelength light to the sample in a second direction;

an objective lens for obtaining transmitted light from the sample;

an imaging information acquisition unit for obtaining imaging information of the sample through the transmitted light, wherein the imaging information acquisition unit comprises:

a first camera for obtaining a first imaging information of the sample through a first transmitted light, the transmitted light of the first wavelength light, from the sample; and a second camera for obtaining a second imaging information of the sample through a second transmitted light, the transmitted light of the second wavelength light, from the sample;

a first dichroic beam splitter disposed among the objective lens, the first camera, and the second camera, for guiding the first transmitted light to the first camera and guiding the second transmitted light to the second camera; and a tilt correction unit disposed between the objective lens and the first dichroic beam splitter for correcting tilts of focal planes of the first transmitted light and the second transmitted light, and wherein a focal plane of the sample photographed by the sample photographing module is tilted at a predetermined angle.

2. The microscope of claim 1, wherein the tilt correction unit comprises:

a correction mirror formed with a tilt of a predetermined angle for correcting the tilts of the focal planes of the first transmitted light and the second transmitted light obtained from the objective lens;

a first signal transmission objective lens for obtaining the first transmitted light and the second transmitted light whose focal planes are corrected by the correction mirror; and a pre-beam splitter for guiding the first transmitted light and the second transmitted light obtained from the objective lens to the correction mirror and guiding the first transmitted light and the second transmitted light obtained from the first signal transmission objective lens to the first dichroic beam splitter.

3. The microscope of claim 1, wherein the tilt correction unit comprises:

a second signal transmission objective lens for transmitting the first transmitted light and the second transmitted light obtained from the objective lens; and a third signal transmission objective lens disposed to be tilted at a predetermined angle from the second signal transmission objective lens, for obtaining the first transmitted light and the second transmitted light from the second signal transmission objective lens and correcting the tilts of the focal planes of the first transmitted light and the second transmitted light.

4. The microscope of claim 1, wherein the sample photographing module further comprises a scanning unit disposed between the objective lens and the tilt correction unit for moving a photographing area of the sample as an angle is adjusted.

5. The microscope of claim 1, further comprising:

a transfer module coupled to the sample photographing module for moving the sample photographing module in a horizontal direction.

6. The microscope of claim 1, wherein the light source unit is composed of one light source, and the imaging generator comprises:

a one-side light source image generator for generating a one-side light source image generated by the one light source;

an opposite light source image generator for generating an opposite light source image from the one-side light source image;

a phase recovery unit for recovering a phase from the one-side light source image and the opposite light source image; and a final image generator for generating a final image from the one-side light source image, the opposite light source image, and the recovered phase.

7. A method for operating a microscope enabling differential phase contrast imaging of oblique focal plane, the method comprising:

a sample photographing step for photographing a sample by a sample photographing module; and an imaging generation step for generating a sample imaging by an imaging generator on the basis of an image of the sample photographed in the sample photographing module, wherein the sample photographing step comprises:

a light radiation step for radiating light to the sample by a light source unit, wherein the light radiation step comprises:

a first light radiation step for radiating a first wavelength light to the sample in a first direction by a first light source unit; and a second light radiation step for radiating a second wavelength light to the sample in a second direction by a second light source unit;

a transmitted light acquisition step for obtaining transmitted light from the sample by an objective lens;

an imaging information acquisition step for obtaining imaging information of the sample through the transmitted light by an imaging information acquisition unit, wherein the imaging information acquisition step comprises:

a first imaging information acquisition step for obtaining a first imaging information of the sample through a first transmitted light, the transmitted light of the first wavelength light, by a first camera; and a second imaging information acquisition step for obtaining a second imaging information of the sample through a second transmitted light, the transmitted light of the second wavelength light, by a second camera;

a tilt correction step for correcting tilts of focal planes of the first transmitted light and the second transmitted light by a tilt correction unit disposed among the objective lens, the first camera, and the second camera, after the transmitted light acquisition step; and an imaging information guide step for guiding the first transmitted light to the first camera and guiding the second transmitted light to the second camera by a first dichroic beam splitter disposed among the tilt correction unit, the first camera, and the second camera, and wherein a focal plane of the sample photographed in the sample photographing step is tilted at a predetermined angle.

8. The method of claim 7, wherein the tilt correction step comprises:

a first guide step for guiding the first transmitted light and the second transmitted light obtained in the objective lens to a correction mirror formed with a tilt of a predetermined angle by a pre-beam splitter;

a mirror correction step for correcting the tilts of the focal planes of the first transmitted light and the second transmitted light obtained in the objective lens by the correction mirror;

a first signal transmission step for obtaining the first transmitted light and the second transmitted light, whose focal planes are corrected by the correction mirror, from a first signal transmission objective lens; and a second guide step for guiding the first transmitted light and the second transmitted light obtained from the first signal transmission objective lens to the first dichroic beam splitter by the pre-beam splitter.

9. The method of claim 7, wherein the tilt correction step comprises:

a first transmission step for moving the first transmitted light and the second transmitted light obtained from the objective lens to a second signal transmission objective lens; and a second transmission step for obtaining the first transmitted light and the second transmitted light from the second signal transmission objective lens by a third signal transmission objective lens, wherein the third signal transmission objective lens in the second transmission step is disposed to be tilted at a predetermined angle from the second signal transmission objective lens, for correcting the tilts of the focal planes of the first transmitted light and the second transmitted light.

10. The method of claim 7, wherein the sample photographing step further comprises a scanning unit rotation step for moving a photographing area of the sample after the imaging information guide step as a scanning unit disposed between the objective lens and the tilt correction unit adjusts an angle.

11. The method of claim 7, further comprising:

a transfer step for moving the sample photographing module in a horizontal direction by a transfer module coupled to the sample photographing module, after the imaging generation step.

* * * * *